(12) United States Patent
Fujiki et al.

(10) Patent No.: US 7,584,243 B2
(45) Date of Patent: Sep. 1, 2009

(54) INFORMATION PROCESSING METHOD AND APPARATUS MAINTAINING CONSISTENCY OF SHARED DATA

(75) Inventors: Masakazu Fujiki, Kawasaki (JP); Toshikazu Ohshima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 317 days.

(21) Appl. No.: 10/534,750

(22) PCT Filed: Nov. 28, 2003

(86) PCT No.: PCT/JP03/15274

§ 371 (c)(1),
(2), (4) Date: May 12, 2005

(87) PCT Pub. No.: WO2004/051480

PCT Pub. Date: Jun. 17, 2004

(65) Prior Publication Data

US 2006/0075058 A1 Apr. 6, 2006

(30) Foreign Application Priority Data

Nov. 29, 2002 (JP) ............................. 2002-348726

(51) Int. Cl.
*G06F 15/16* (2006.01)
*G06F 15/173* (2006.01)

(52) U.S. Cl. .................. 709/203; 709/205; 709/219; 709/229; 709/248

(58) Field of Classification Search .......... 709/203, 709/205, 219, 229, 248
See application file for complete search history.

(56) References Cited

U.S. PATENT DOCUMENTS 6,012,081 A 1/2000 Dorn et al. ............. 709/102

(Continued)

FOREIGN PATENT DOCUMENTS

JP 5-334161 12/1993

(Continued)

OTHER PUBLICATIONS

U.S. Appl. No. 11/217,469, filed Sep. 2, 2005, Kaname Tanimura, et al.

(Continued)

*Primary Examiner*—Nathan J Flynn
*Assistant Examiner*—Jeong S Park
(74) *Attorney, Agent, or Firm*—Fitzpatrick, Cella, Harper & Scinto

(57) ABSTRACT

An information processing method maintains, in a system in which each of a plurality of client processes connected via an information transmission medium holds and uses shared data to be shared by the plurality of client processes, consistency of shared data held by the respective plurality of client processes. The method includes an input step of inputting a manipulation request, a determining step of determining a mode corresponding to the input manipulation request, from a plurality of modes including a first mode and a second mode, and a processing step of executing a process corresponding to the manipulation request in accordance with the mode determined in the determining step. The processing step includes a sending step of sending, when the manipulation request requests a manipulation of the shared data, request information that represents the manipulation request to a server process, a reception step of receiving response information corresponding to the request information sent in the sending step, from the server process, and a manipulation execution step of executing a manipulation for the shared data in accordance with the manipulation request or the response information received in the reception step.

6 Claims, 30 Drawing Sheets

U.S. PATENT DOCUMENTS

| | | | |
|---|---|---|---|
| 6,571,278 B1 * | 5/2003 | Negishi et al. | 709/213 |
| 2002/0129103 A1 * | 9/2002 | Birkler et al. | 709/203 |
| 2003/0037111 A1 | 2/2003 | Yoshioka | 709/205 |

FOREIGN PATENT DOCUMENTS

| | | |
|---|---|---|
| JP | 6-337829 | 12/1994 |
| JP | 10-111825 | 4/1998 |
| JP | 10-124330 | 5/1998 |
| JP | 11-219309 | 8/1999 |
| JP | 2001-273219 | 10/2001 |
| JP | 2002-157158 | 5/2002 |

OTHER PUBLICATIONS

U.S. Appl. No. 10/547,766, filed Sep. 2, 2005, Masakazu Fujiki, et al.
U.S. Appl. No. 11/187,980, filed Jul. 25, 2005, Masakazu Fujiki.
U.S. Appl. No. 11/140,996, filed Jun. 1, 2005, Yasuhiro Okuno, et al.
U.S. Appl. No. 10/546,168, filed Aug. 18, 2005, Toshihiro Kobayashi, et al.
G. Hesina et al., "Distributed Open Inventor: A Practical Approach to Distributed 3D Graphics", in Proc. of the ACM Symposium on Virtual Reality Software and Technology (VRST '99), pp. 74-81.

* cited by examiner

F I G. 10
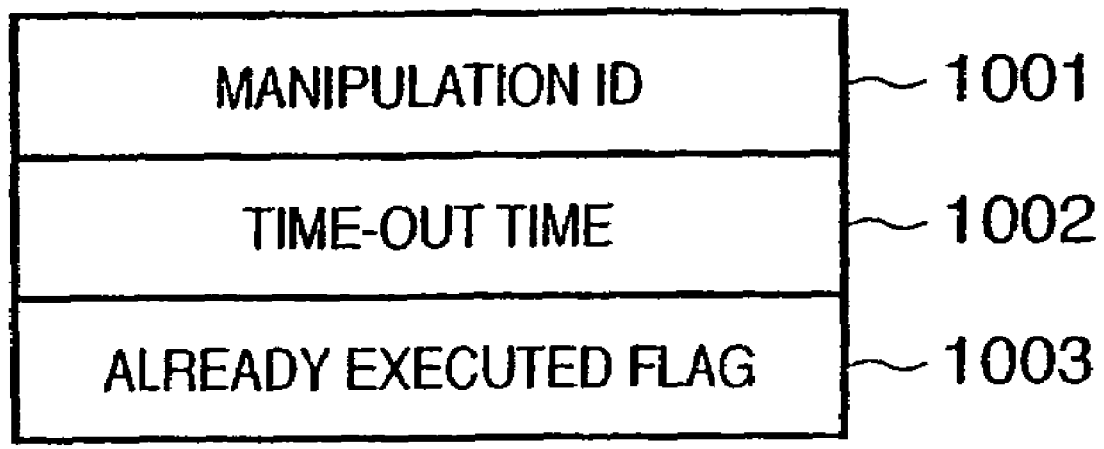

F I G. 27
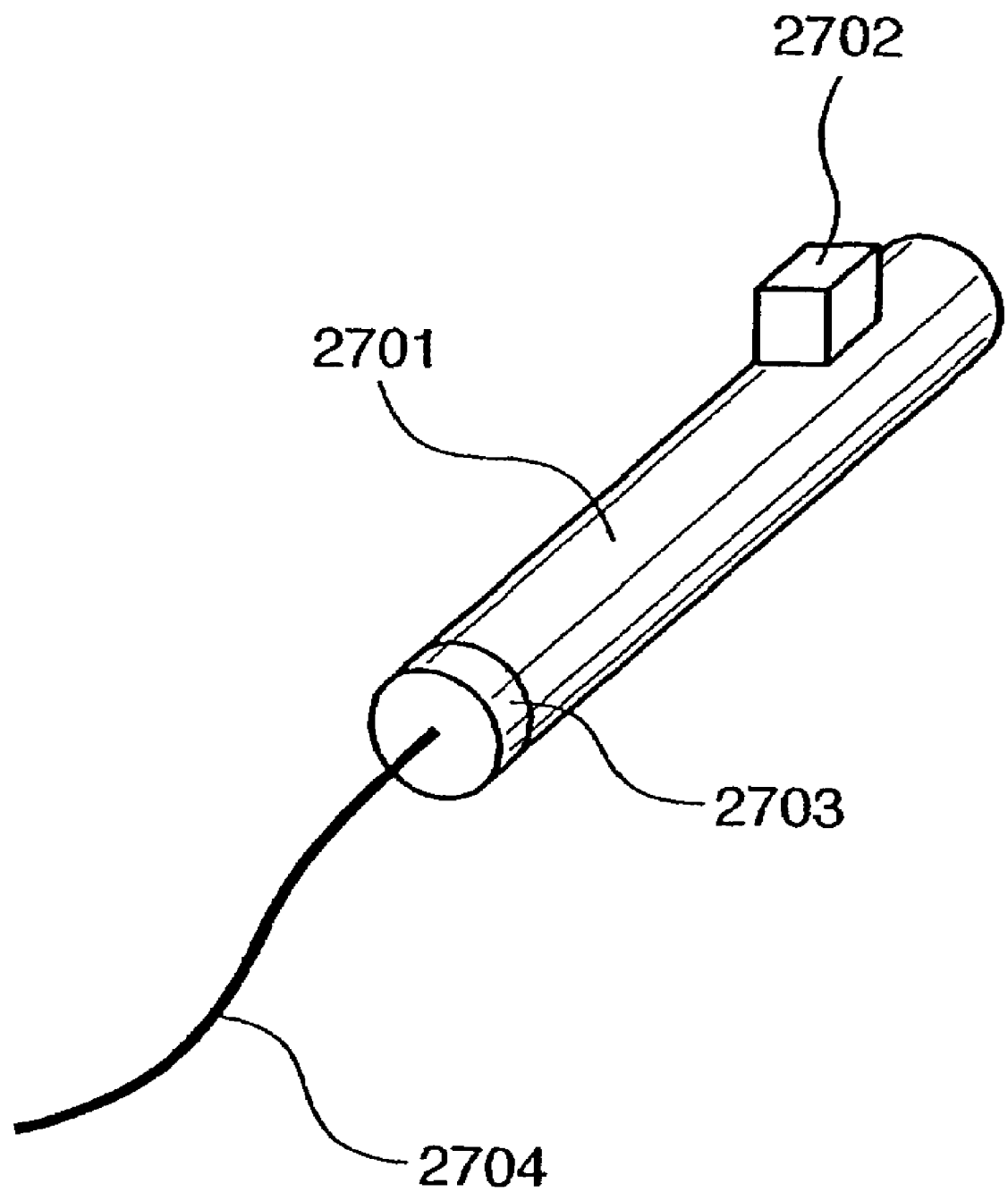

INFORMATION PROCESSING METHOD AND APPARATUS MAINTAINING CONSISTENCY OF SHARED DATA

TECHNICAL FIELD

The present invention relates to a technique for sharing data among a plurality of processes and, more particularly, to a technique suited to synchronize databases, which hold data that describe a three-dimensional virtual space, among a plurality of processes via a network.

BACKGROUND ART

A technique for sharing a three-dimensional (3D) virtual space among different computer terminals is indispensable to implement remote meeting systems, network games, cooperative design systems, and the like.

Such system that shares a 3D virtual space refers to a large volume of data at short time intervals so as to draw moving images on the virtual space by computer graphics. At this time, it is not practical to acquire whole virtual space data held in one apparatus (e.g., server) via a network due to the narrow bandwidth of the current network. Therefore, in a method which is currently adopted, respective terminals have copies of the virtual space data and generate CG images by referring to them. When an arbitrary manipulation (e.g., movement or rotation of a virtual object) has been made for the virtual space on a given computer terminal, information associated with that manipulation is transmitted to other terminals via the network, thus reflecting that information on the databases of the respective terminals. As a result, the consistency among the databases of the respective computer terminals is maintained.

Details of the sequence for holding the consistency among the databases in the conventional virtual space sharing system will be described below. That is, a manipulation for the virtual space at a given computer terminal is immediately reflected on the local database of that terminal, and the manipulation information is transmitted to other computer terminals. Other terminals receive this manipulation information, and update their data according to the received manipulation information.

As an implementation example of such virtual space sharing system, Distributed Open Inventor (source: G. Heshina et. al.: "Distributed Open Inventor: A practical Approach to Distributed 3D Graphics", in Proc. of the ACM Symposium on Virtual Reality Software and Technology (VRST'99), pp. 74-81, 1999) is known.

However, in the conventional virtual space sharing system, the contents of a given manipulation are immediately reflected on a database of a terminal at which that manipulation has been made, and other terminals update their databases after they receive that manipulation information. Therefore, the terminal at which the manipulation has been made and other terminals update their databases at different timings. Especially, if it takes long until reception of manipulation information due to the influence of network traffic or the like, the update timing differences of the databases among the terminals become large. For this reason, it is more likely that the terminals generate different drawing results of the virtual space.

The manipulation and update sequences of the databases are fixed to those described above, and the data update timing cannot be selected or adjusted.

Therefore, a system which allows a plurality of processes to nearly concurrently execute a manipulation for shared data, which is shared by these processes, is demanded.

DISCLOSURE OF INVENTION

According to one aspect of the present invention, there is provided an information processing method for maintaining, in a system in which each of a plurality of processes connected via an information transmission medium holds and uses shared data to be shared by the processes, consistency of shared data held by the respective processes, comprising: an output step of outputting, when a manipulation request for the shared data is generated, request information that represents the manipulation request onto the information transmission medium; a reception step of receiving the request information output in the output step and response information corresponding to request information output by other processes from the information transmission medium; and a manipulation execution step of executing a manipulation for the shared data in accordance with manipulation request indicated by the response information received in the reception step.

Furthermore, according to another aspect of the present invention, there is provided an information processing apparatus for maintaining, in a system in which each of a plurality of processes connected via an information transmission medium holds and uses shared data to be shared by the processes, consistency of shared data held by the respective processes, comprising: an output unit configured to, when a manipulation request for the shared data is generated, output request information that represents the manipulation request onto the information transmission medium; a reception unit configured to receive the request information output by the output unit and response information corresponding to request information output by other processes from the information transmission medium; and a manipulation execution unit configured to execute a manipulation for the shared data in accordance with manipulation request indicated by the response information received in the reception unit.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 shows an example of the data configuration of a manipulation queue item;

FIG. 27 is a perspective view showing the outer appearance and arrangement of a stylus device in the fifth embodiment;

BEST MODE FOR CARRYING OUT THE INVENTION

Preferred embodiments of the present invention will now be described in detail in accordance with the accompanying drawings.

First Embodiment

The first embodiment will explain an implementation example in which an information processing method according to the present invention is applied to a virtual space sharing system that allows a plurality of terminals to share scene databases which describe the structure and properties of a virtual space.

Figure 1:
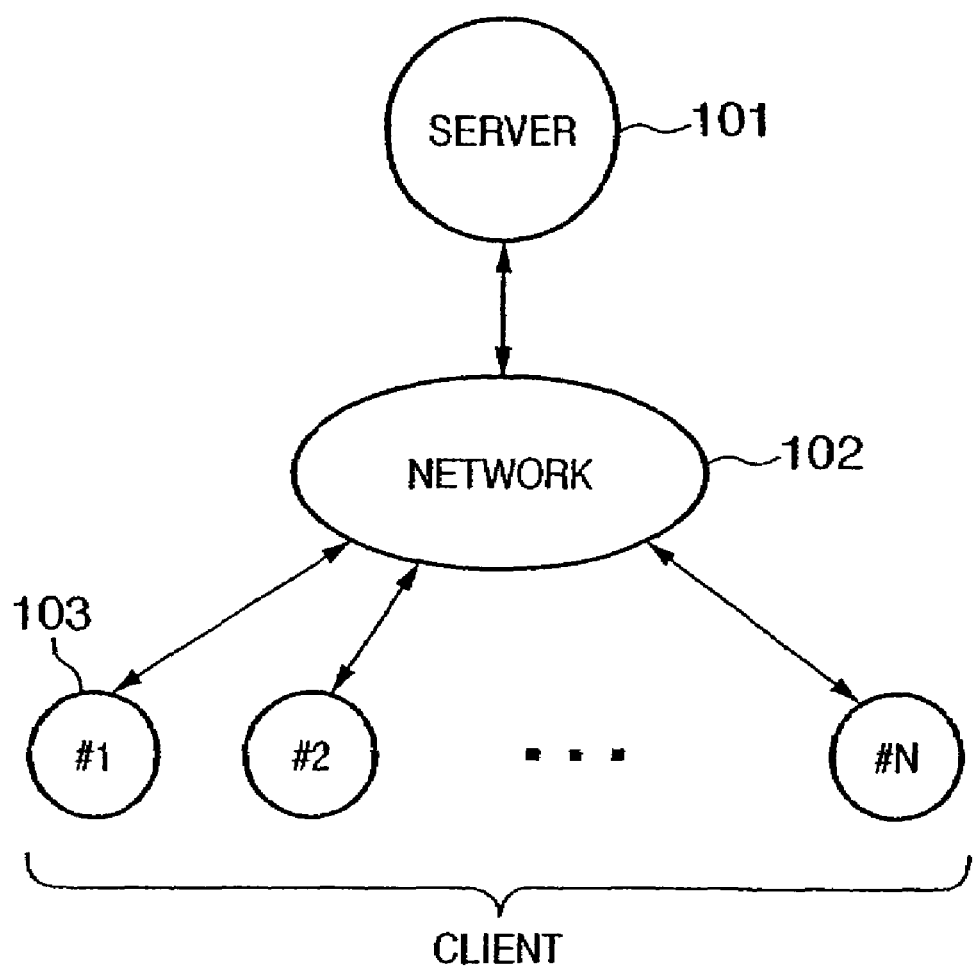
FIG. 1 is a block diagram showing the overall arrangement of a database sharing system according to the first embodiment.

FIG. 1 shows the overall arrangement of the virtual space sharing system of this embodiment. The system includes one server process 101 (to be simply referred to as a "server" hereinafter), and a plurality of client processes 103 ((to be simply referred to as "clients" hereinafter), which exchange data via a network 102. Each client holds a scene database which describes the structure and properties of a common virtual space. Note that the network 102 of this embodiment is a LAN built on the Ethernet.

A term "database manipulation" used in the following description will be explained. A "manipulation" of a database indicates a procedure for rewriting the contents of a database in an arbitrary process having a shared database. The database manipulation is classified into two procedures, i.e., "manipulation command" and "manipulation execution". The manipulation command is an update request of the database, and does not actually rewrite the contents. The actual rewrite process of the database is executed in the manipulation execution process. Hence, "manipulation" will indicate "database manipulation" herein unless otherwise specified. If an object to be manipulated is other than a database, the object to be manipulated is specified like "interactive device manipulation by the user".

Note that the manipulation command may be generated by the user or by a process during an operation. As the former example, the manipulation command is generated when the user has moved a virtual object by manipulating an interactive device such as a mouse or the like. On the other hand, as the latter example, the manipulation command is generated when, e.g., a game program has algorithmically moved/rotated an enemy character in a shooting game system.

Figure 2:
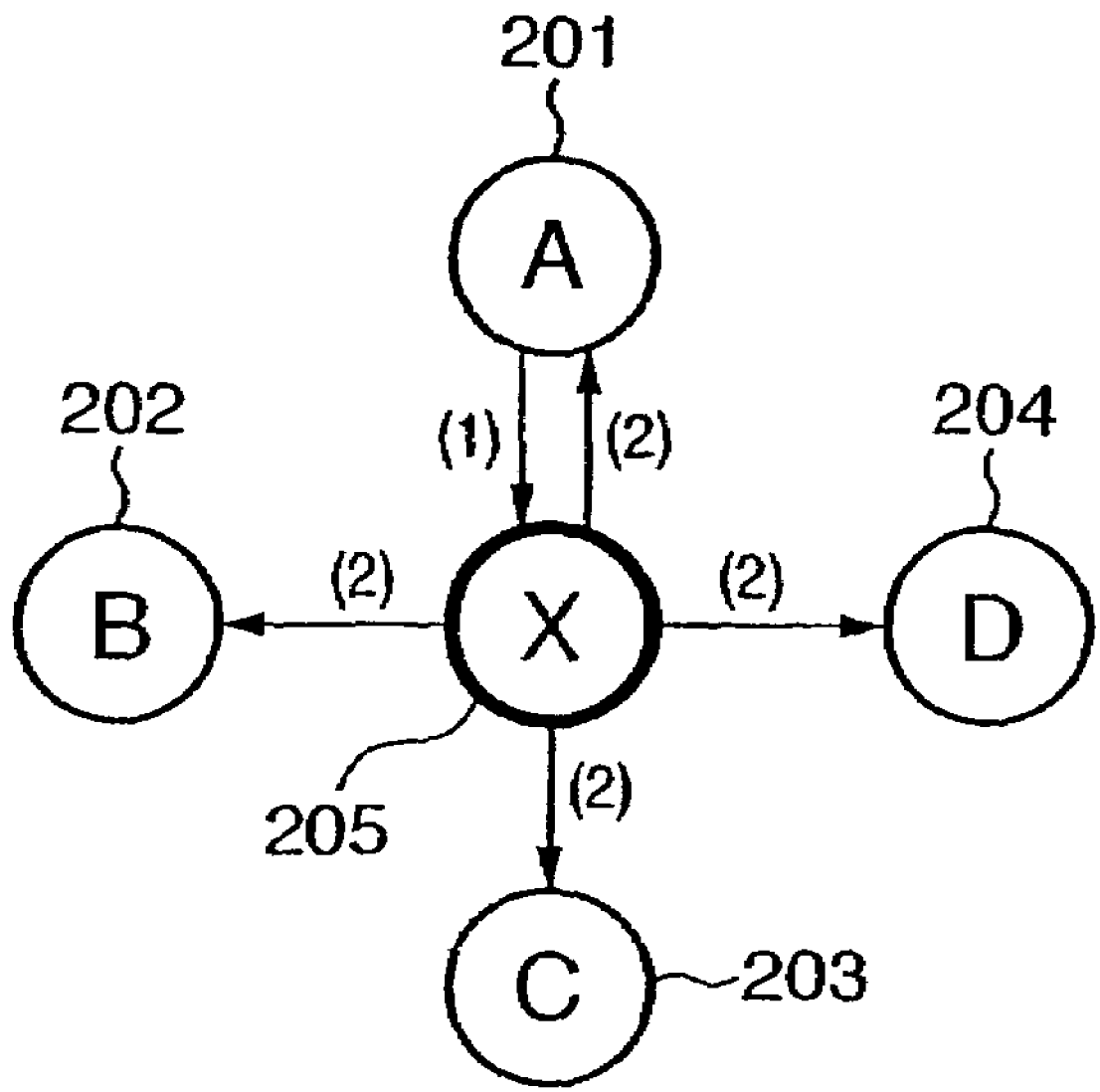
FIG. 2 shows a basic information transmission method among processes according to the first embodiment.

FIG. 2 shows the basic information flow upon updating databases. In FIG. 2, reference symbols A, B, C, and D (201 to 204) denote clients; and X (205), a server. Assume that client A (201) has generated a manipulation command of a scene database. The contents of the manipulation command are transmitted to the server via a network (a process indicated by arrow (1) in FIG. 2). Upon reception of this manipulation command, the server distributes data transmitted from client A (201) to all clients (a process indicated by arrow (2) in FIG. 2). Through these processes, non-manipulator clients B (202), C (203), and D (204) can also detect the manipulation contents.

Hereafter, data which represents the manipulation contents is occasionally inscribed with "event".

Figure 3:
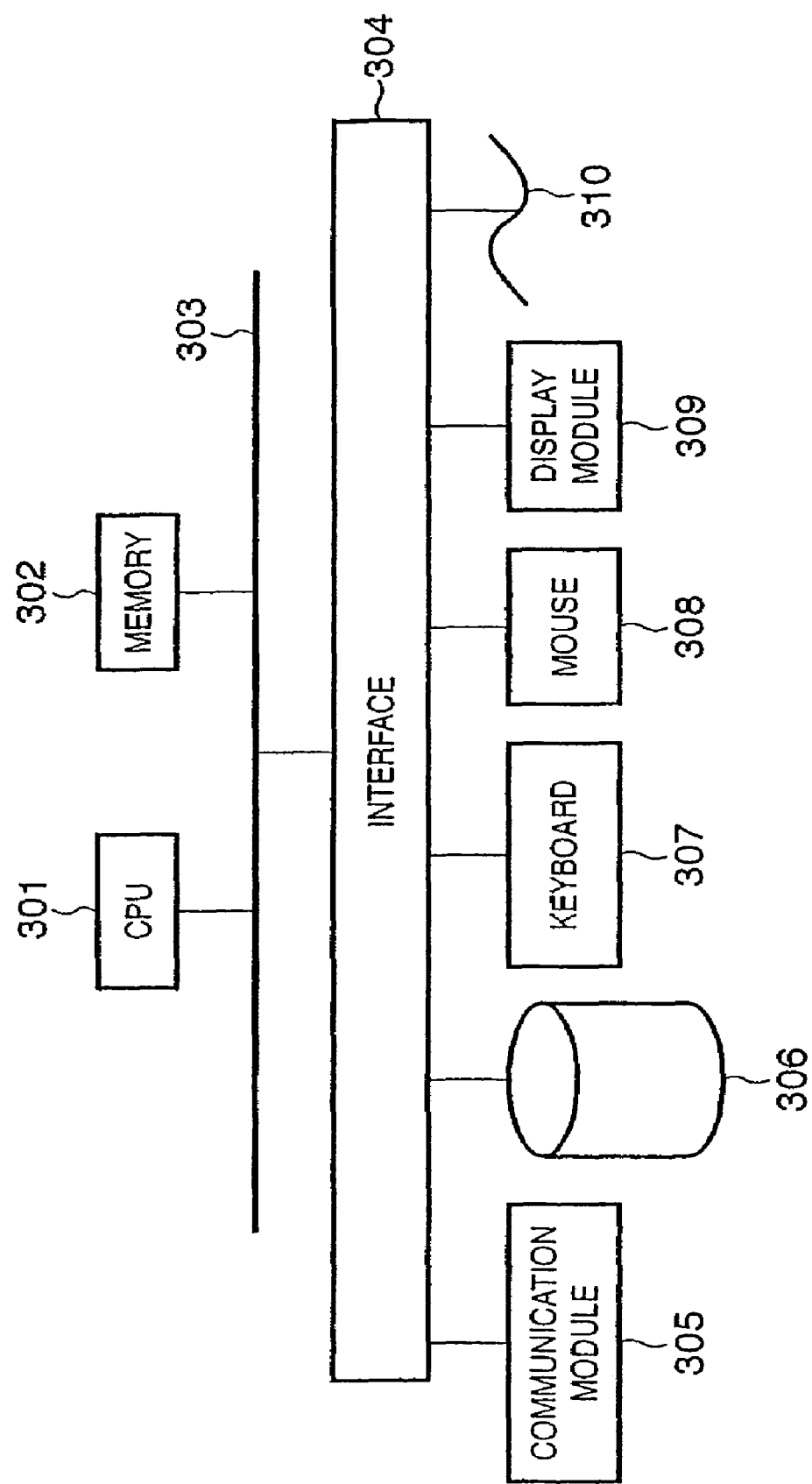
FIG. 3 is a block diagram showing the hardware arrangement of a terminal device according to the first embodiment.

FIG. 3 shows the arrangement of a terminal on which the client or server process runs. Referring to FIG. 3, reference numeral 301 denotes a CPU which controls the operation of the overall terminal. Reference numeral 302 denotes a memory which stores programs and data used in operations of the CPU 301. Reference numeral 303 denotes a bus which transfers data among respective building modules. Reference numeral 304 denotes an interface between the bus 303 and respective devices. Reference numeral 305 denotes a communication module which is used to send data to or to receive data from the network; 306, an external storage device which stores programs and data to be loaded by the CPU 301; 307 and 308, a keyboard and mouse, which form an input device used to designate operations of programs; 309, a display module which displays the operation result of the process; and 310, an input/output module with devices outside the terminal. For example, a stylus device shown in FIG. 27 is connected.

The system of this embodiment has the following three modes in association with the update timings of a database. These modes will be generically named as "update mode" hereinafter.

(1) Wait mode
(2) Immediate mode
(3) Delay mode

The respective modes will be described in detail below.

Figure 4:
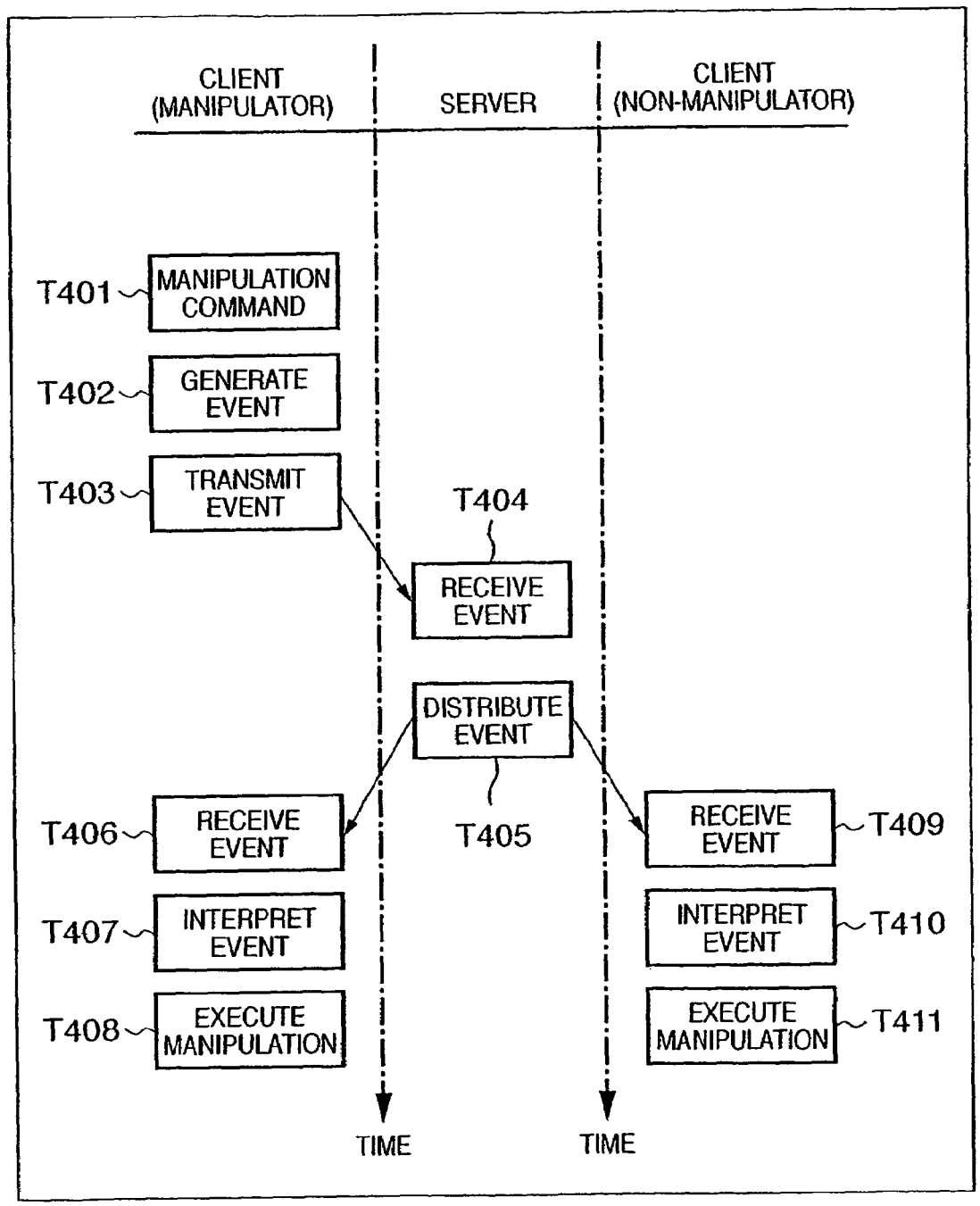
FIG. 4 is a chart showing the database update sequence in a wait mode.

In "wait mode", manipulation execution of a given manipulation command is made after waiting for distribution of an event from the server. FIG. 4 illustrates the processing sequence along with an elapse of time in the wait mode. In FIG. 4, "manipulator" indicates a client that has generated the manipulation command, and "non-manipulator" indicates a client other than the manipulator. The procedures progress as follows.

In procedure T401, the manipulator client issues a manipulation command of a database. At this time, the database of the-manipulator client is not updated. An event that indicates the manipulation contents in procedure T401 is generated in procedure T402, and is transmitted to the server in procedure T403. The server receives that event in procedure T404, and transmits the event to all clients which have established connection to the server in procedure T405 (establishment of connection will be explained later in step S1102 in FIG. 11). The manipulator client receives the event issued by the server in procedure T406, analyzes the contents of the event (T407), and rewrites the database (T408). The same procedures after reception of the event apply to each non-manipulator client (procedures T409 to T411). As shown in FIG. 4, in the wait mode a time lag is generated from the manipulation command (T401) until the manipulation execution (T408). However, if information is transferred on the network under the same condition, it is expected that both manipulator and non-manipulator clients update their databases at nearly the same time, and images on the virtual space are synchronized among the clients.

Figure 5:
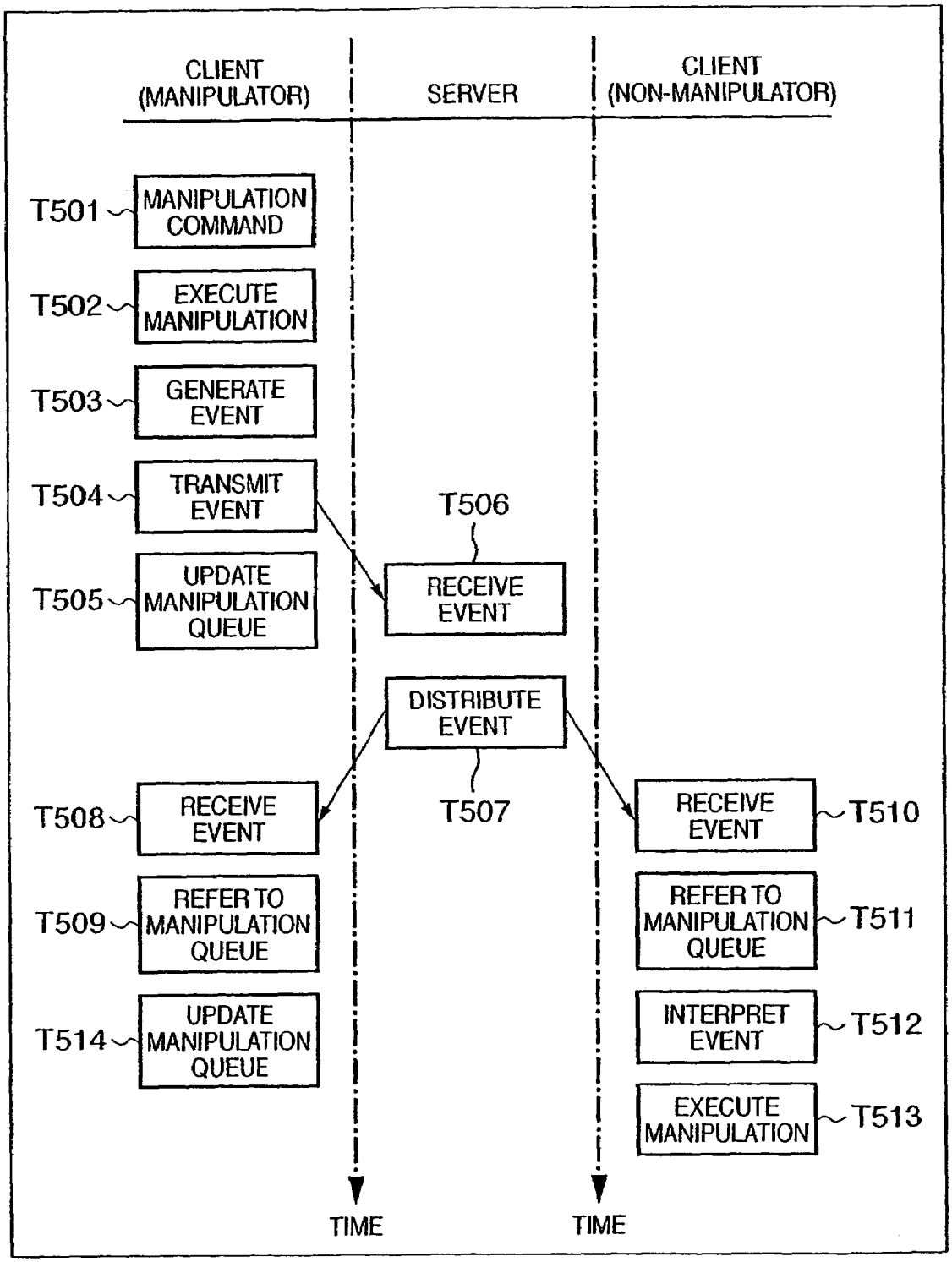
FIG. 5 is a chart showing the database update sequence in an immediate mode.

In "immediate mode", a manipulator's command is immediately reflected on the database, and a non-manipulator's database is updated behind that update timing. FIG. 5 illustrates the processing sequence along with an elapse of time in the immediate mode. The procedures progress as follows.

In procedure T501, the manipulator client issues a database manipulation command. In procedure T502, the database is updated in accordance with the contents of the manipulation command. After that, an event indicating the manipulation contents is generated (T503), and is transmitted to the server (T504). After event transmission, the manipulator client holds information indicating the manipulation command in procedure T501 and its execution in a manipulation queue (T505; "manipulation queue" will be described later).

The server receives the event in procedure T506, and transmits that event to all clients in procedure T507. Upon reception of the event from the server in procedure T508, the manipulator client refers to the manipulation queue (T509). Since the manipulator client recognizes based on the information recorded in procedure T505 that the manipulation has already been executed, it skips the manipulation execution process, and deletes the information recorded in procedure T505 (T514).

On the other hand, each non-manipulator client recognizes with reference to its manipulation queue that the event received in procedure T510 has not been executed yet (T511), and executes the manipulation on the basis of the event contents (T512, T513).

When the databases are updated in the aforementioned sequence, the time delay produced until the manipulator client reflects the manipulation result for the virtual space on a CG image can be shorter than in the wait mode. Therefore, the immediate mode is mainly suitable for a case wherein the user manipulates a virtual object using an interactive device. This is because if any time difference is generated between the user's interactive manipulation and presentation of its result, problems (e.g., making manipulations harder, making the user uncomfortable, and so forth) are normally posed.

Figure 6:
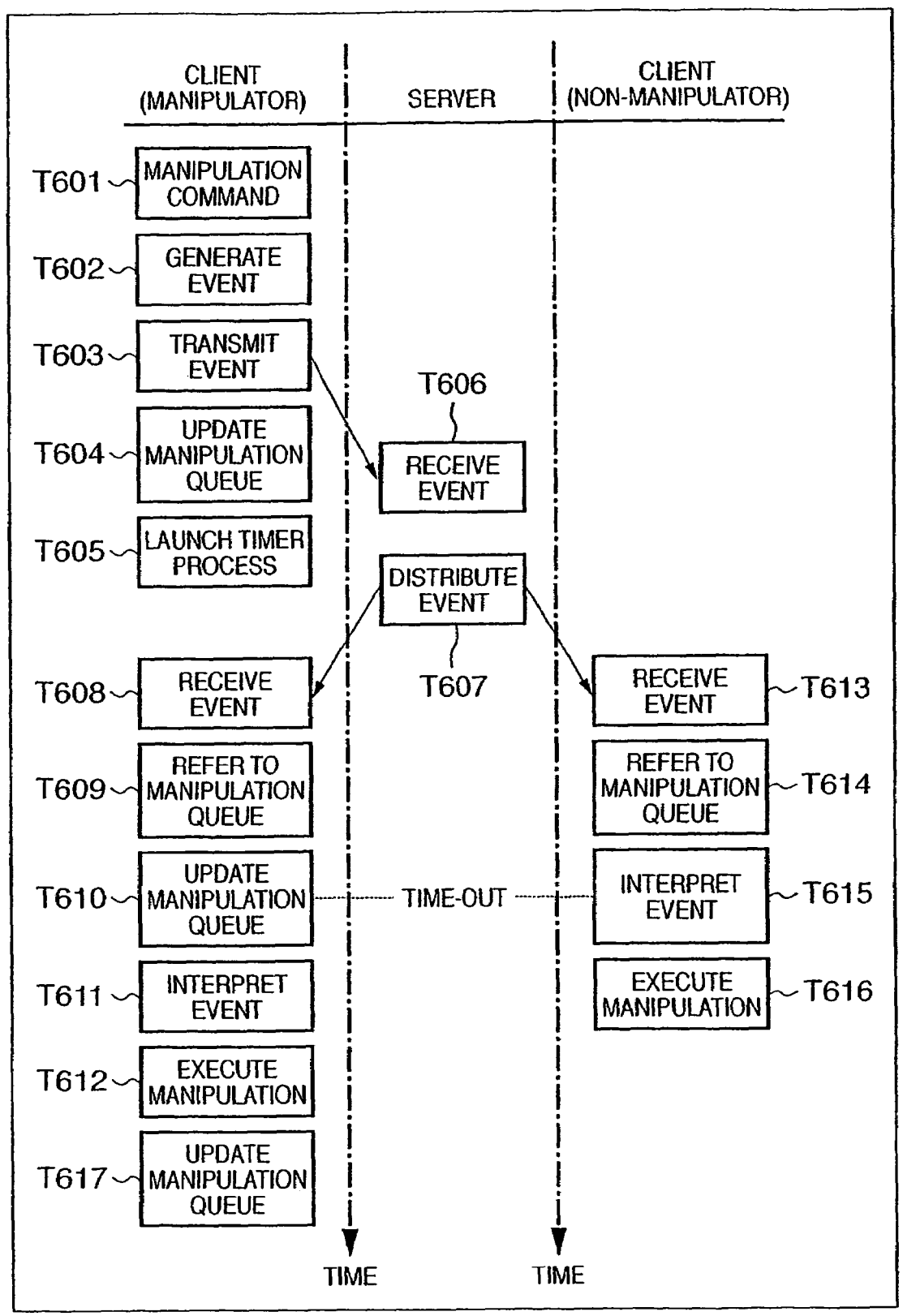
FIG. 6 is a chart showing the database update sequence in a delay mode (when a time-out is not generated)

In the "delay mode", the manipulation command is not immediately executed unlike in the wait mode, but a manipulation execution time limit is set, and the manipulation is executed without waiting for an event sent back from the server if the manipulation execution time limit has been reached. FIG. 6 illustrates the processing sequence along with an elapse of time when an event comes from the server before the manipulation execution time limit is reached in the delay mode. The procedures progress as follows.

Figure 19:
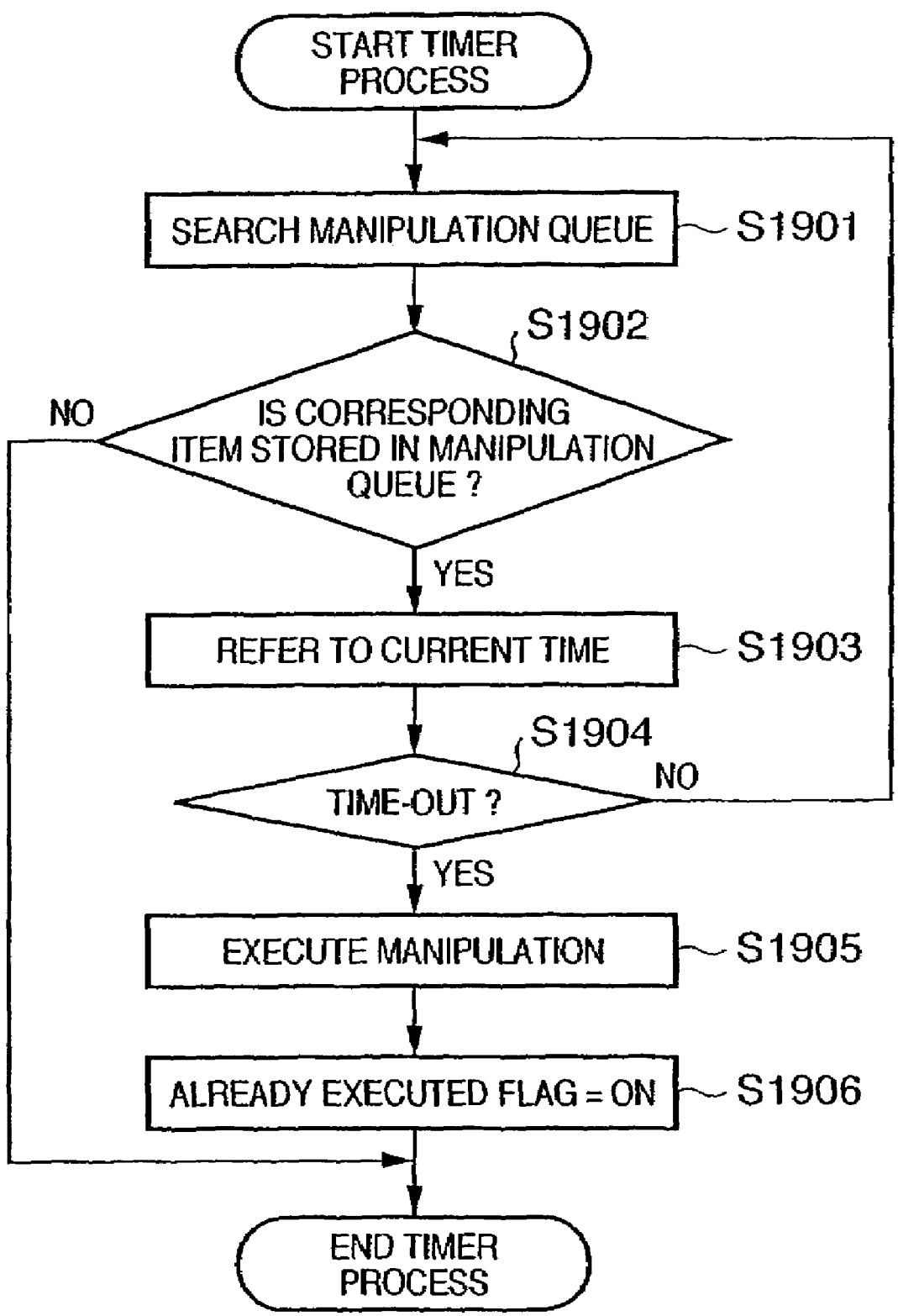
FIG. 19 is a flow chart for explaining a timer process.

In procedure T601, the manipulator client issues a database manipulation command. At this time, the database is not updated. An event indicating the contents of the manipulation in procedure T601 is generated in procedure T602, and is transmitted to the server in procedure T603. After event transmission, the manipulator client holds information indicating the manipulation command in procedure T601 in a manipulation queue (T604; "manipulation queue" will be described later), and launches a timer process (T605). The timer process executes the manipulation if a time-out is generated, and details thereof will be described later using FIG. 19.

The server receives the event in procedure T606, and transmits the event to all clients in procedure T607. The manipulator client receives the event in procedure T608 and refers to the manipulation queue (T609). Since the manipulator client recognizes that the manipulation has not been executed yet, it records information indicating that the manipulation has already been executed in the manipulation queue (T610), analyzes the contents of the event (T611), and rewrites the database (T612). Furthermore, the manipulator client deletes information recorded in procedure T604 (T617). Also, each non-manipulator client recognizes that the event received in procedure T613 has not been executed yet (T614), and executes the manipulation based on the event contents (T615, T616).

Figure 7:
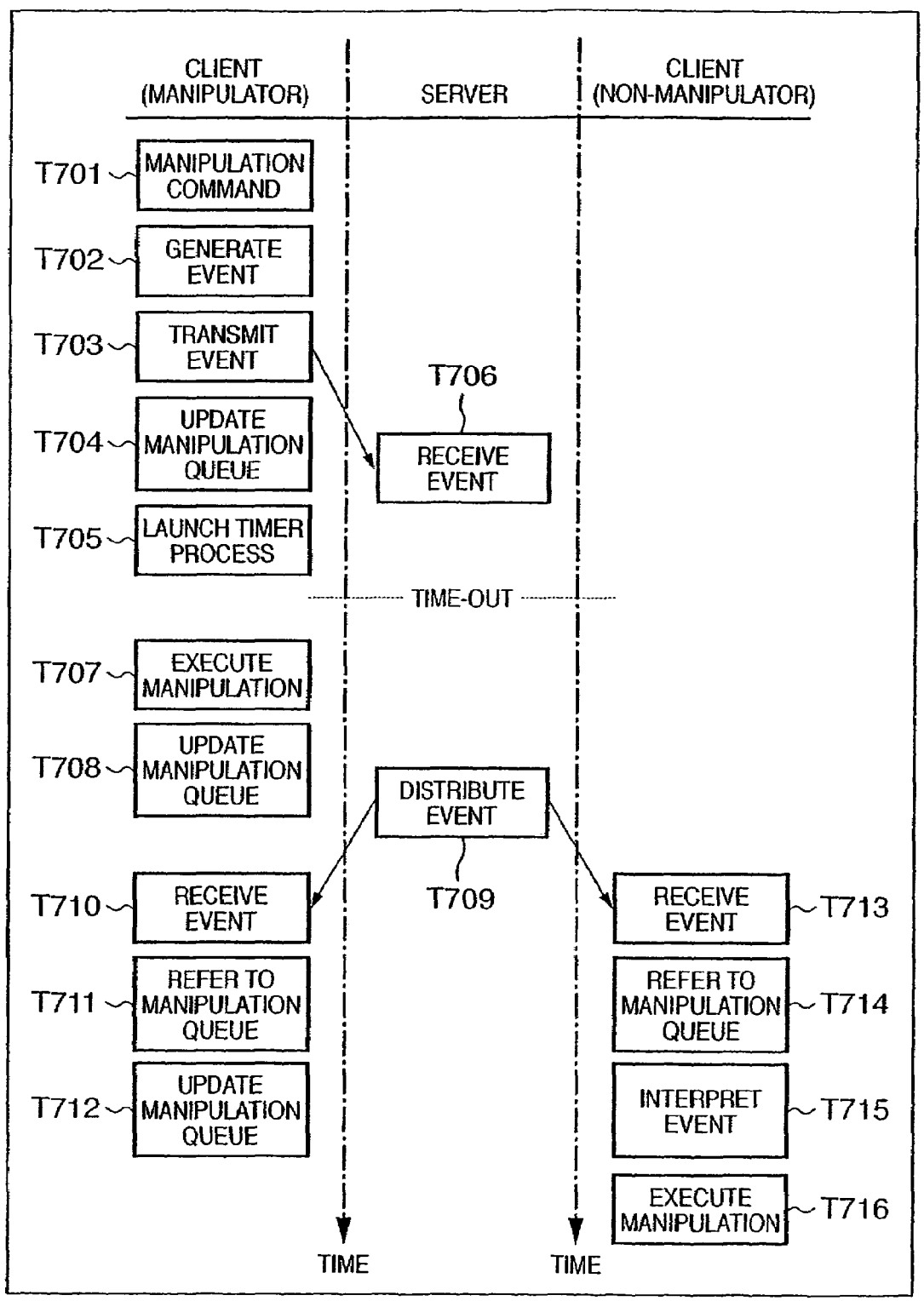
FIG. 7 is a chart showing the database update sequence in a delay mode (when a time-out is generated)

On the other hand, FIG. 7 illustrates the processing sequence along with an elapse of time when the manipulation execution time limit (time-out) is reached before an event comes from the server in the delay mode. The procedures progress as follows.

In procedure T701, the manipulator client issues a database manipulation command. At this time, the database is not updated. An event indicating the contents of the manipulation in procedure T701 is generated in procedure T702, and is transmitted to the server in procedure T703. After event transmission, the manipulator client holds information indicating the manipulation command in procedure T701 in a manipulation queue (T704; "manipulation queue" will be described later), and launches a timer process (T705). The timer process executes the manipulation if a time-out is generated, and details thereof will :be described later using FIG. 19. The server receives the event in procedure T706, and transmits the event to all clients in procedure T709.

If the time-out time is reached before a corresponding event is received from the server, it is detected in the timer process, and the manipulator client executes the manipulation in procedure T707 and stores information indicating that the manipulation has already been executed in the manipulation queue (T708). Therefore, although the manipulator client receives the event in procedure T710, it recognizes with reference to the manipulation queue that the manipulation has already been executed (T711), and updates a manipulation history (T712 (deletes a manipulation queue item corresponding to the event which has already been executed and has already been distributed from the server process)). Each non-manipulator client recognizes that the event received in procedure T713 has not been executed yet (T714), and executes the manipulation based on the event contents (T715, T716).

When the databases are updated in the aforementioned sequence, if a time lag upon event distribution is large, operations are made to minimize the delay time before the manipulation execution; if a time lag is small, operations are made to synchronize clients. Such operations are automatically switched, and which of operations are dominant can be adjusted by appropriately setting the time-out time.

Figure 8:
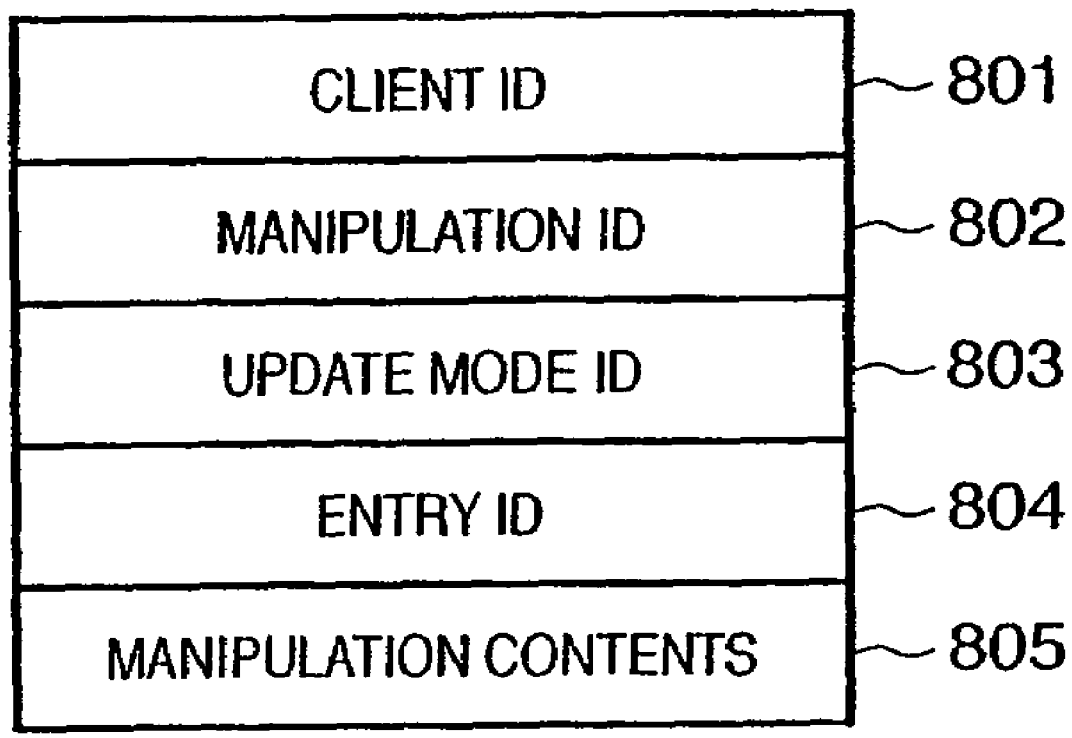
FIG. 8 shows an example of the data configuration of event data.

FIG. 8 shows the contents of an event issued from the client to the server, or from the server to the client. Event data is made up of a plurality of fields. A client ID field 801 stores a number which is used to uniquely identify each client and is assigned by the server when the client establishes network connection to the server (to be described later in step S1102 in FIG. 11). A manipulation ID field 802 stores a number which is used to uniquely identify a manipulation, and is assigned when a manipulation command is issued at each client. Using the pair of client and manipulation IDs, all manipulation commands that have been issued in the system can be uniquely specified.

An update mode ID field 803 stores an identification number which is uniquely determined for each update mode, and is determined by an update mode of a manipulation command corresponding to this event. Since the update modes are set and registered in each entry of the database (to be described later using FIG. 24), the update mode is set with reference to that entry. An entry ID field 804 stores a number which is used to uniquely identify each entry of the database, and is assigned upon loading data from a file. A manipulation content field 805 stores the detailed contents of a manipulation command. For example, when a manipulation for setting the X-coordinate of a CG object to a given value is made, this field stores a set of a number that identifies an X-coordinate property, and an X-coordinate setting value.

Figure 9:
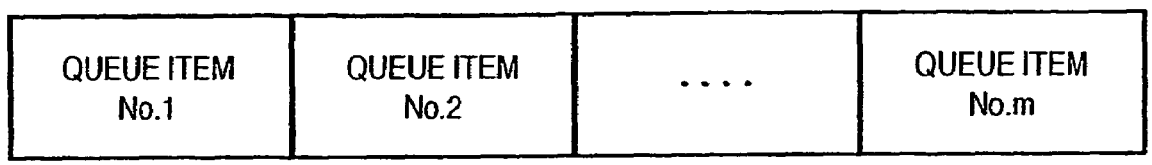
FIG. 9 shows an example of the data configuration of a manipulation queue.

The manipulation queue will be described below. The manipulation queue is a list of manipulation commands which wait for reception of events or execution processes. If there are m manipulation commands in the waiting state at an arbitrary time, the manipulation queue is formed by listing up m pieces of information (queue items) associated with manipulation commands in the order the commands are generated, as shown in FIG. 9.

The contents of one queue item are formed of three data fields, as shown in FIG. 10. A manipulation ID field 1001 stores a number which is used to uniquely identify a manipulation, and has the same value as that of the manipulation ID field of the corresponding event. The value of the manipulation ID field 1001 is assigned when a manipulation command is issued at each client. A time-out time field 1002 stores a manipulation execution time limit in the delay mode, and this time limit is calculated by adding a predetermined time-out time to the current time when a manipulation command is issued at each client. An already executed flag field 1003 indicates if a manipulation having that manipulation ID has already been executed in the immediate or delay mode. The already executed flag is set to OFF when a manipulation command is issued, and is changed to ON when the manipulation is executed.

Note that FIG. 10 shows the manipulation queue item having three fields. Alternatively, the already executed flag and time-out time may be combined. In this case, when the time-out time assumes a special value (e.g., −1), such case may be defined to indicate that the manipulation has already been executed.

The processing flows of the client and server will be described in detail below.

Figure 11:
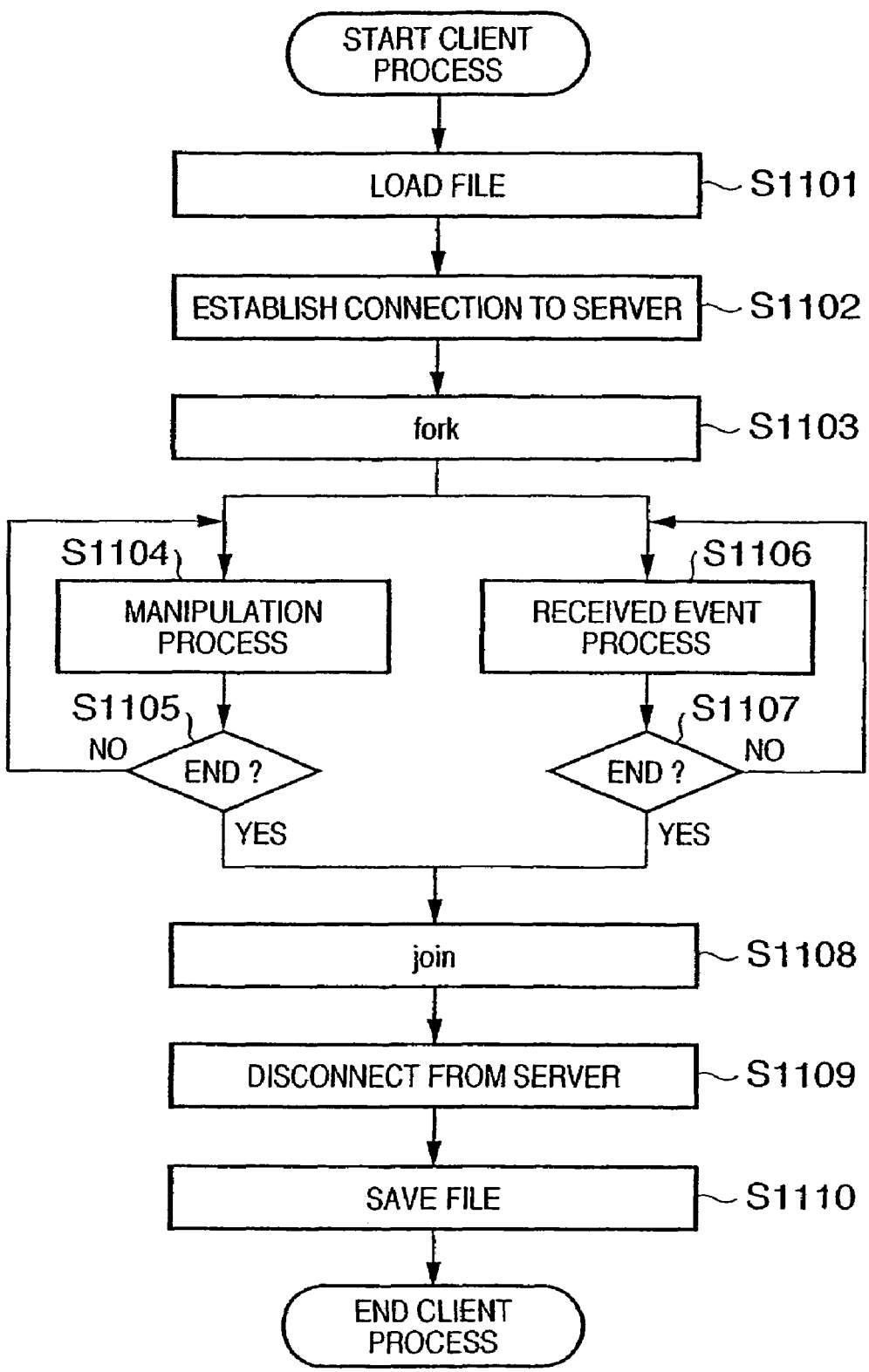
FIG. 11 is a flow chart showing a client process according to the first embodiment.

FIG. 11 shows the overall flow of the client process. When the client is started up, it loads a file that describes the virtual space from the external storage device 306 (FIG. 3) in step S1101 to build a scene graph database on the memory 302 (FIG. 3). In order to maintain data consistency among clients, the files to be loaded have the same contents among clients. The client establishes network connection to the server (step S1102). At this time, the server assigns a client ID which is used to identify each client. Note that data exchange between the client and server is attained by a one-to-one socket communication using the TCP/IP protocol. Therefore, the server has socket communication paths as many as at least the number of clients.

In step S1103, the procedure forks to launch a manipulation process (step S1104) for processing a manipulation command, and a received event process (step S1106) for processing an event received from the server. Note that a process for generating a CG image of the virtual space with reference to the scene graph database is also launched (not shown in FIG. 11). Since this process is the same as the known CG image generation method, a detailed description thereof will be omitted. The manipulation process and received event process will be described in detail later. In each of the manipulation process and received event process, it is checked in step S1105 or S1107 if a process end instruction is detected. If NO in step S1105 or S1107, the flow returns to step S1104 or S1106 to continuously process the manipulation command or received event. On the other hand, if YES in step S1105 or S1107, the processes are joined in step S1108. After network connection to the server is disconnected (step S1109), the contents of the database are saved as a file in the external storage device (306 in FIG. 3) (step S1110), thus ending all processes.

Figure 12:
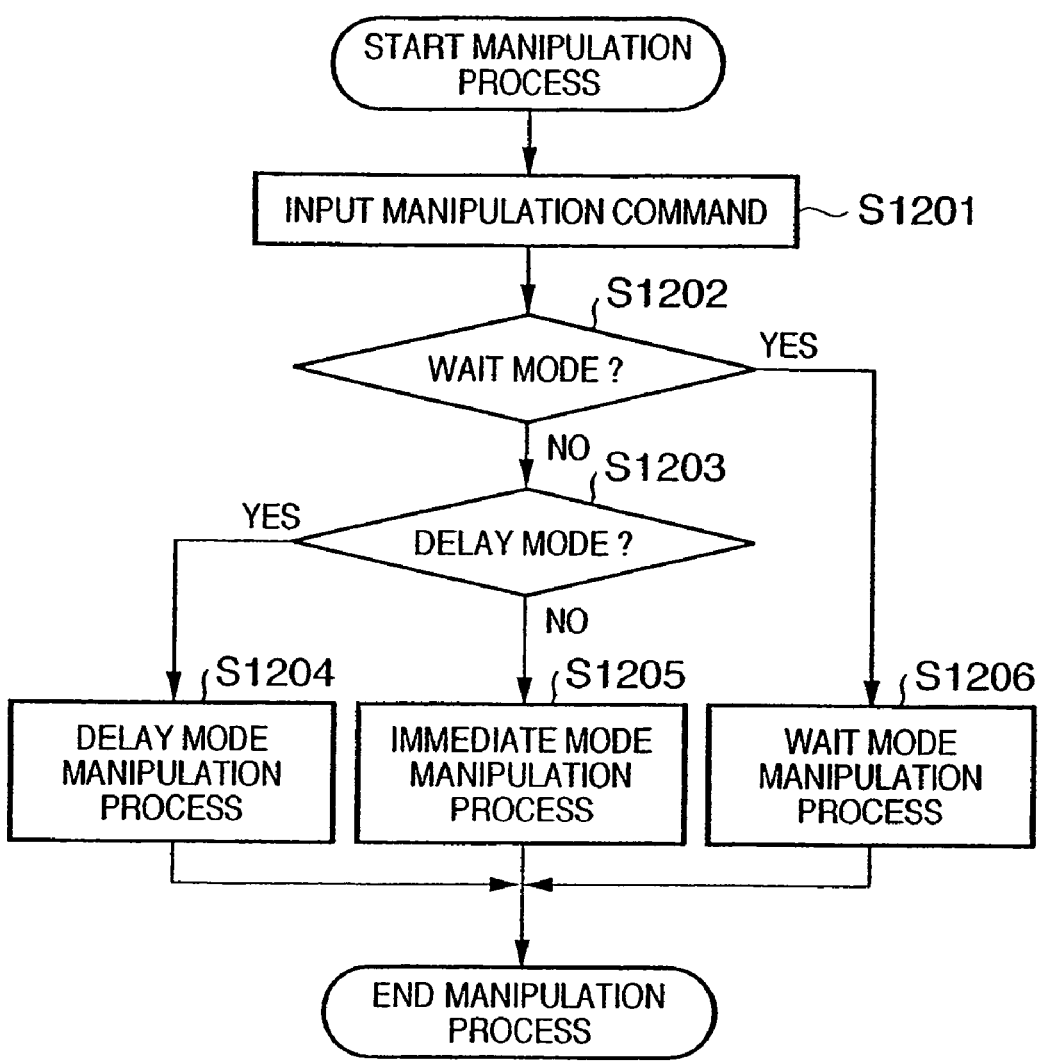
FIG. 12 is a flow chart showing a manipulation process in the client process.

The manipulation process in step S1104 will be described in detail below with reference to FIG. 12. Initially, the contents of a manipulation command are input in step S1201. At this time, a manipulation ID number that uniquely specifies the manipulation command is determined. In steps S1202 and S1203, an update mode is determined with reference to the entry of the database. After one of step S1206 (wait mode manipulation process), step S1205 (immediate mode manipulation process), and step S1204 (delay mode manipulation process) is executed depending on the update mode, the process ends. The manipulation processes for respective update modes will be described in detail below with reference to FIGS. 13 to 15.

Figure 13:
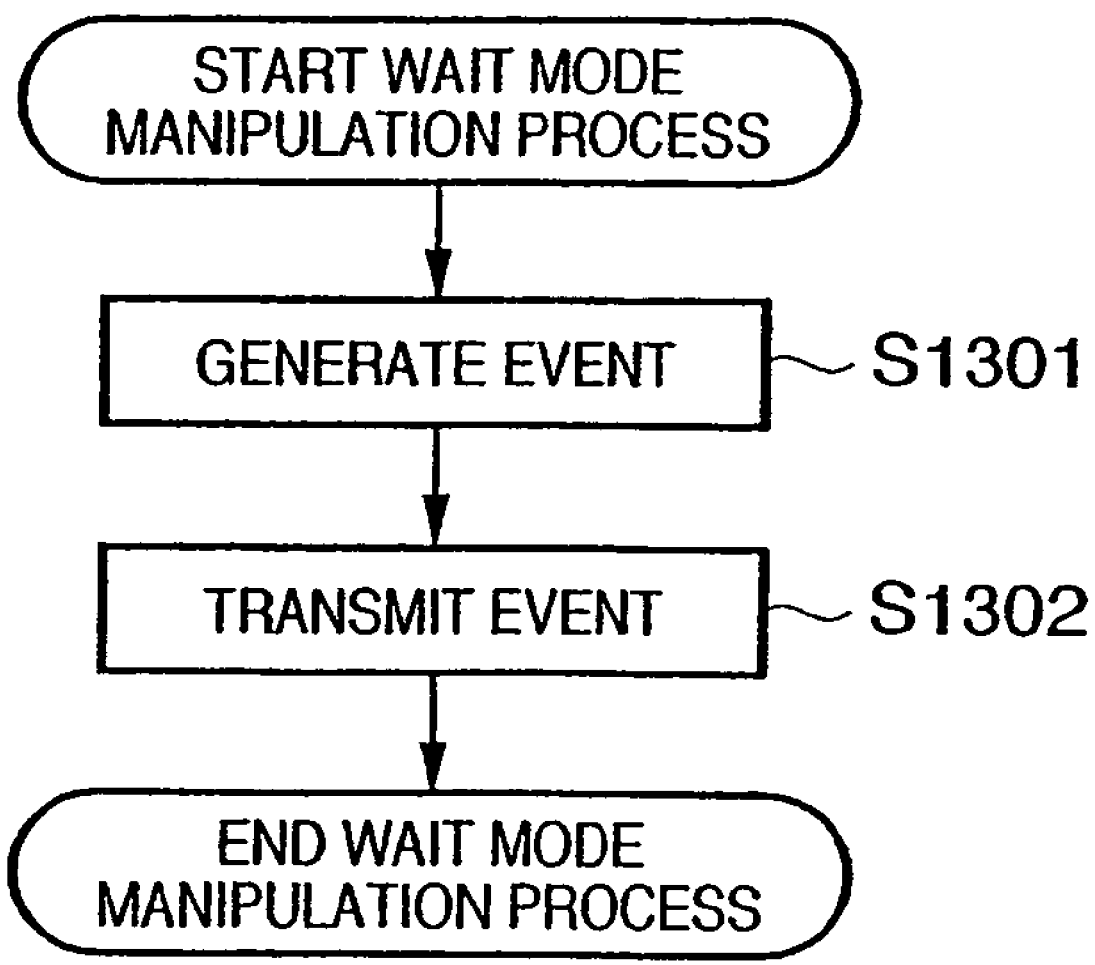
FIG. 13 is a flow chart for explaining a wait mode manipulation process in FIG. 12.

FIG. 13 shows the flow of the wait mode manipulation process. In step S1301, event data (see FIG. 8) is generated based on the contents of the manipulation input in step S1201. The flow then advances to step S1302 to send the generated event data to the server.

Figure 14:
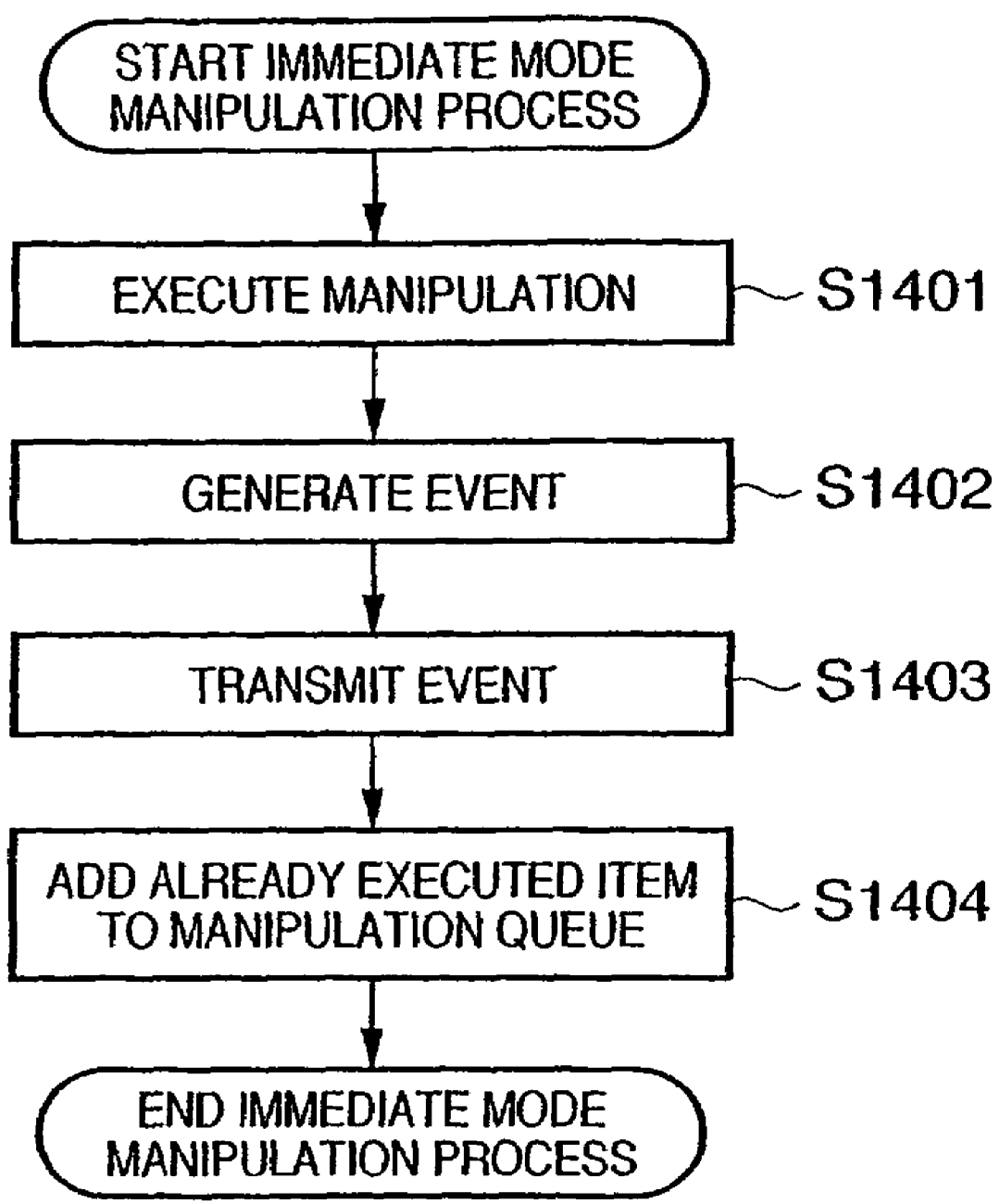
FIG. 14 is a flow chart for explaining an immediate mode manipulation process in FIG. 12.

The flow of the immediate mode manipulation process is as shown in FIG. 14. In step S1401, the manipulation command input in step S1201 is executed. More specifically, the setting value of the designated entry of the database is changed. Next, an event is generated (step S1402), and is sent to the server (S1403) as in the wait mode. Finally, in step S1404 a manipulation queue item in which the manipulation ID number determined in step S1201 is set in the manipulation ID field and the already executed flag is set to ON is added to the manipulation queue. At this time, since the time-out time is not used in the process, it can be arbitrarily set (e.g., 0).

Figure 15:
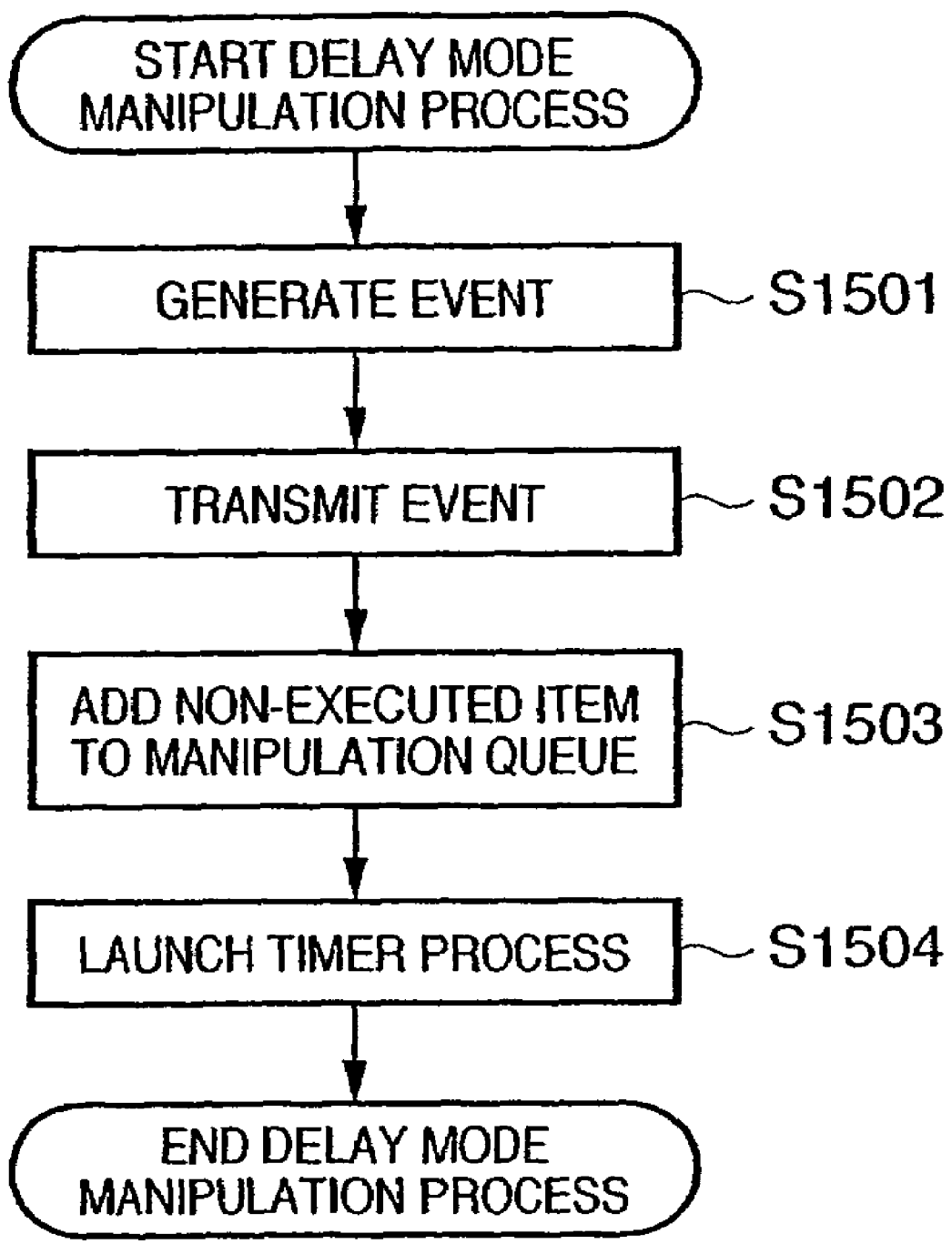
FIG. 15 is a flow chart for explaining a delay mode manipulation process in FIG. 12.

The delay mode manipulation process will be described below using FIG. 15. An event is generated (step S1501) and is sent to the server (step S1502) as in the wait mode. A manipulation queue item in which the manipulation ID number determined in step S1201 is set in the manipulation ID field, the sum of the current time and a predetermined time-out time is set in the time-out time field, and the already executed flag is set to OFF is added to the manipulation queue (step S1503). Finally, a timer process is launched by passing the manipulation ID, manipulation contents, and time-out time data to it (step S1504). The timer process will be described in detail later.

Figure 16:
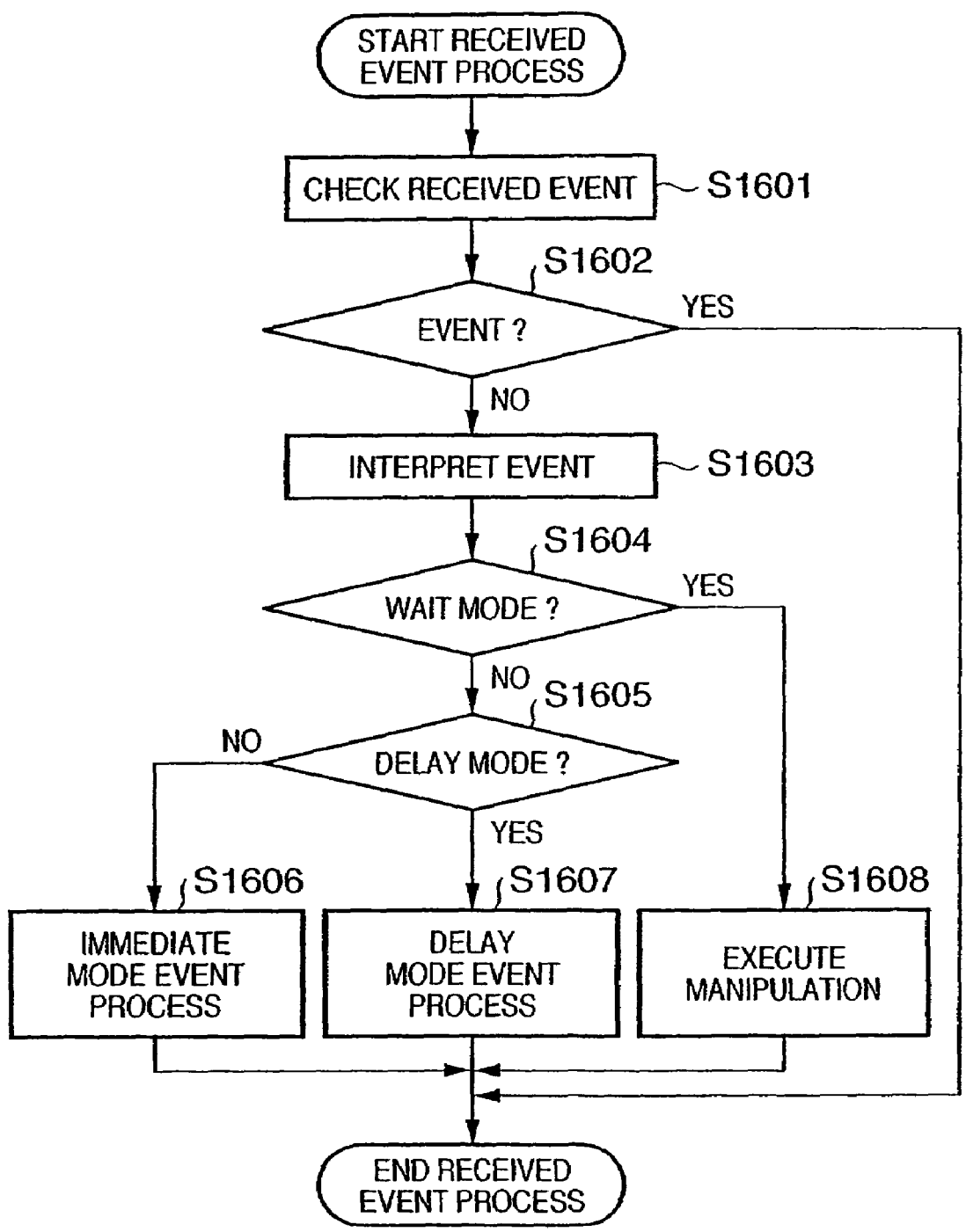
FIG. 16 is a flow chart showing a received event process in the client process shown in FIG. 11.

The received event process in step S1106 (FIG. 11) will be described in detail below. FIG. 16 shows the flow of the received event process. The received event is received from the server by an event communication module (not shown) and is input to a received event buffer.

In step S1601, the received event buffer is searched. It is checked in step S1602 if an event is input to the received event buffer. If an event is found, the flow advances to step S1603. On the other hand, if it is determined that no received event is present, the process ends. If a received event is found, that event data is interpreted to extract the contents of a manipulation command (step S1603). In steps S1604 and S1605, the update mode of the manipulation command is determined with reference to the update mode ID field of the event. After one of step S1608 (in case of the wait mode), step S1606 (in case of the immediate mode), and step S1607 (in case of the delay mode) is executed in accordance with the determined update mode, the process ends. In step S1608, a manipulation described in the event is executed. More specifically, the setting value of an entry with the designated ID is changed according to the manipulation contents. The immediate mode event process in step S1606 and delay mode event process in step S1607 will be described in detail below with reference to FIGS. 17 and 18, respectively.

Figure 17:
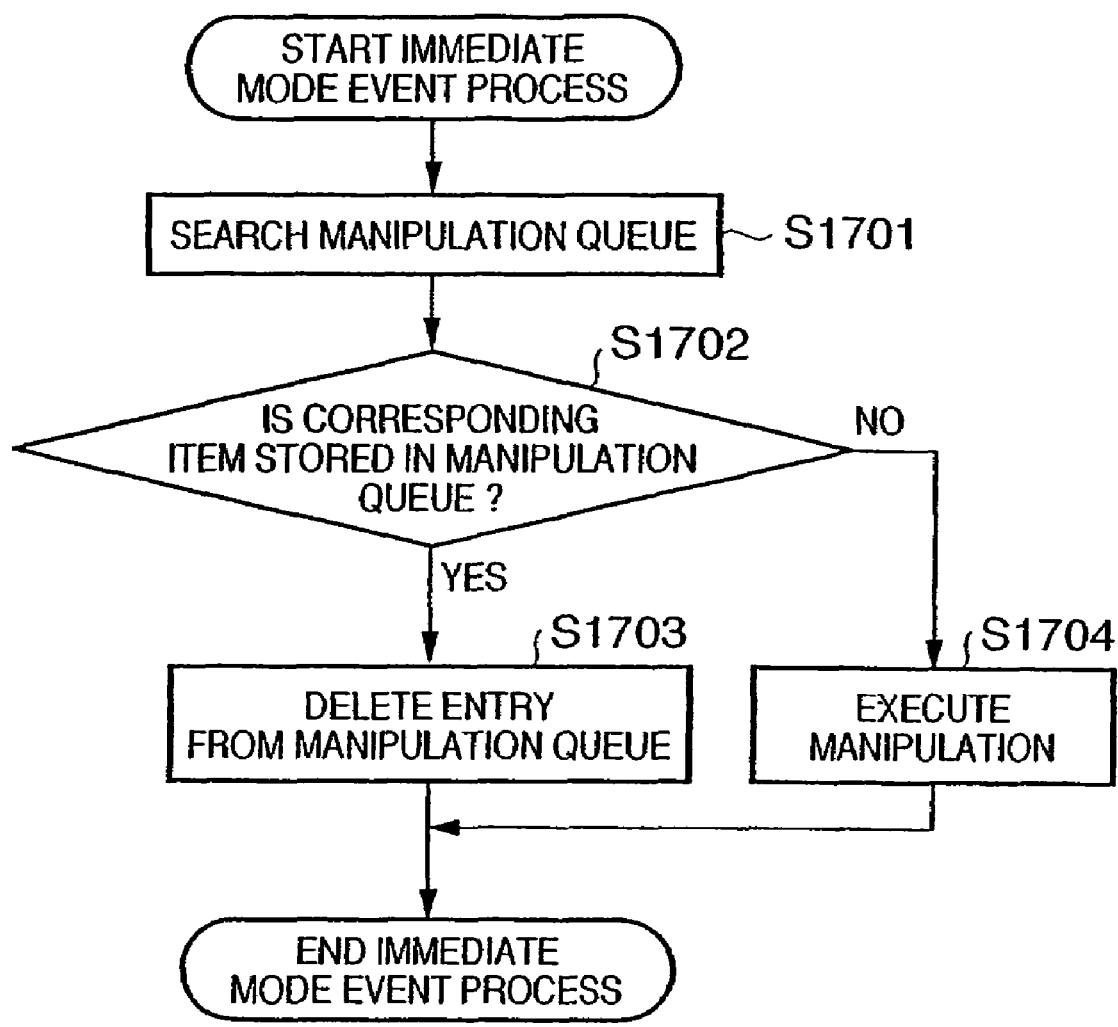
FIG. 17 is a flow chart of an immediate mode received event process in FIG. 16.

FIG. 17 shows the flow of the immediate mode event process. The manipulation queue is searched in step S1701, and it is checked in step S1702 if a manipulation queue item corresponding to the received event is present in the manipulation queue. More specifically, if the client ID of the received event matches the ID of the client on which this process is running, and the manipulation ID of the received event matches that of a manipulation queue item, it is determined that the manipulation command of that manipulation queue item corresponds to that of the received event. In the immediate mode, if the corresponding queue item is found, its manipulation has already been executed at the time when it was generated at the client of interest. Therefore, the manipulation queue entry is deleted in step S1703 without executing any manipulation, thus ending the process. On the other hand, if it is determined in step S1702 that no corresponding queue item is found, that manipulation has not been executed yet since it was generated at a client other than the client of interest. Therefore, the manipulation is executed in step S1704, and the process ends.

Figure 18:
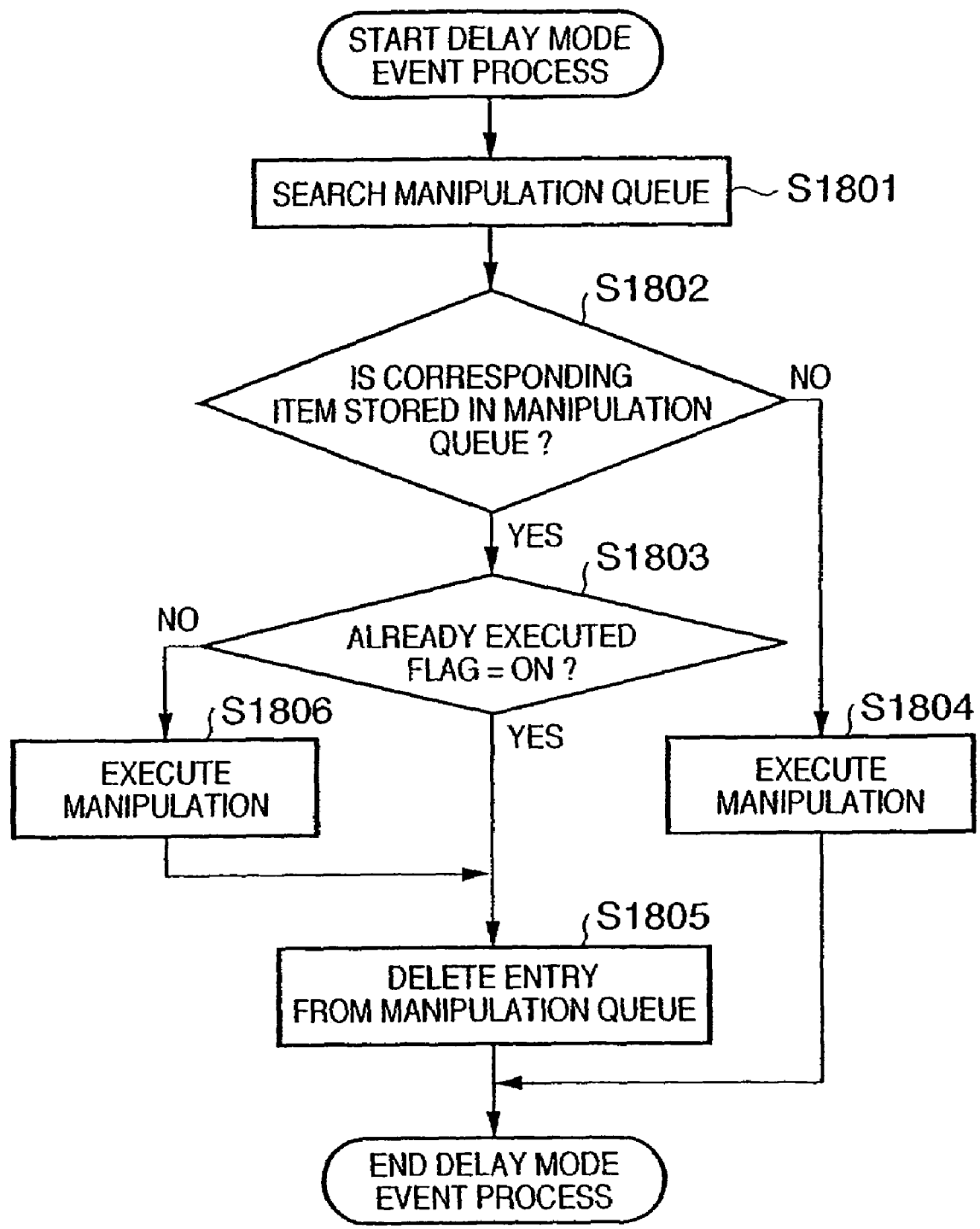
FIG. 18 is a flow chart of a delay mode received event process in FIG. 16.

The flow of the delay mode event process is as shown in FIG. 18. The manipulation queue is searched in step S1801, and it is checked in step S1802 if a manipulation queue item corresponding to the received event is present in the manipulation queue. The process details in step S1802 are the same as in step S1702. If the corresponding manipulation queue item is present, the already executed flag of that manipulation queue item is checked in step S1803. If the already executed flag is ON, since the time-out time has been reached, the timer process has already executed the manipulation. Therefore, the manipulation queue entry is deleted in step S1805 without executing any manipulation, thus ending the process. On the other hand, if it is determined in step S1803 that the already executed flag is OFF, since the time-out time has not been reached yet, the manipulation is not executed. Hence, the manipulation is executed in step S1806, and that item is deleted from the manipulation queue (step S1805). Then, the process ends. If it is determined in step S1802 that no corresponding manipulation queue item is found, that manipulation has not been executed yet since it was generated at a client other than the client of interest. Therefore, the manipulation is executed in step S1804, and the process ends. Note that steps S1804 and S1806 are processes with the same contents.

The timer process launched in step S1504 in FIG. 15 will be described in detail below. This process is executed to cope with a case wherein the time-out time has been reached in the delay mode.

The manipulation queue is searched in step S1901, and it is checked in step S1902 if a manipulation queue item corresponding to the manipulation, which is designated upon launching the timer process, is present. More specifically, if the manipulation ID as an argument upon launching this process matches that of the manipulation queue item, it is determined that the manipulation command of that manipulation queue item corresponds to that which is designated by the argument. If the corresponding queue item is found, this means that the received event corresponding to that manipulation command is not processed, i.e., is not executed. In this case, the flow advances to a process for confirming if the time-out time is reached. That is, the current time is referred to in step S1903, and is compared with the time-out time (step S1904). If the time-out time has been reached, the manipulation is executed in step S1905, and the already executed flag of the corresponding manipulation queue item is set to ON (step S1906). On the other hand, if the time-out time has not been reached yet, the flow returns to step S1901. If it is determined in step S1902 that no corresponding manipulation queue item is found, this means that the received event corresponding to that manipulation command has already been processed, i.e., the manipulation has already been executed. In this case, since neither execution of the manipulation nor the change process of the manipulation queue are required, the process directly ends.

Figure 20:
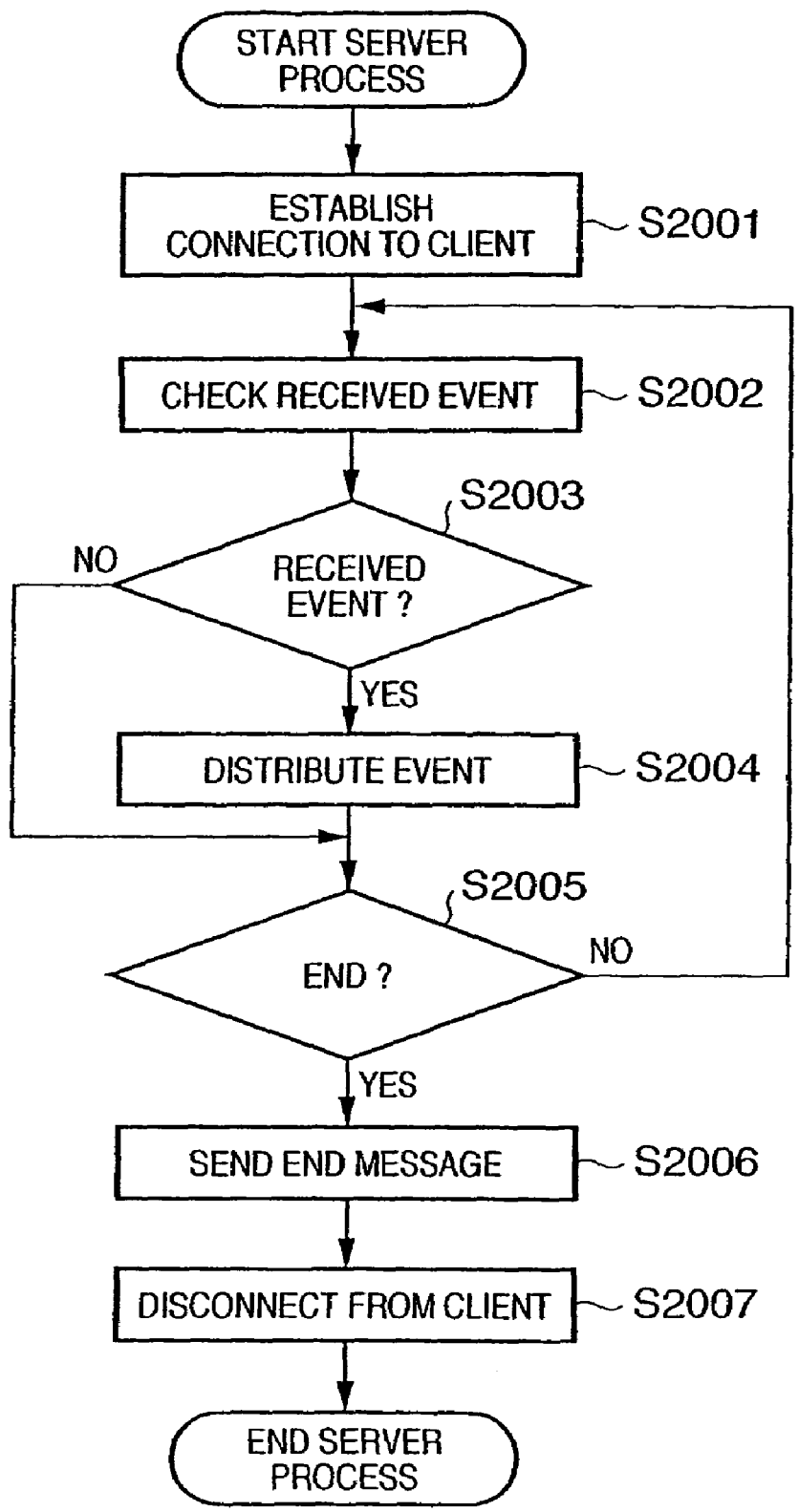
FIG. 20 is a flow chart for explaining a server process according to the first embodiment.

The flow of the client-side process has been explained. The flow of the server-side process will be described in detail below using FIG. 20.

In step S2001, the server accepts connection requests from clients to establish a communication. At this time, the server notifies the clients, with which the communication has been established, of client IDs. The server then searches the received event buffer (step S2002) to check if a received event is present (step S2003). If a received event is found, the flow advances to step S2004; otherwise, the flow jumps to step S2005. In step S2004, the server transmits the event to the connected clients. It is checked in step S2005 if the server process is to end in response to a user's command (for example, an end button is assigned to an arbitrary key of the keyboard, and when that key is pressed, a user's end command is issued). If the server process is to end, the flow advances to step S2006; otherwise, the flow returns to step S2002. In step S2006, the server notifies the connected clients that the process is to end, and disconnects connection to the clients (step S2007), thus ending the process.

The configuration of the database description file to be loaded by the client in this embodiment will be described below.

Figure 24:
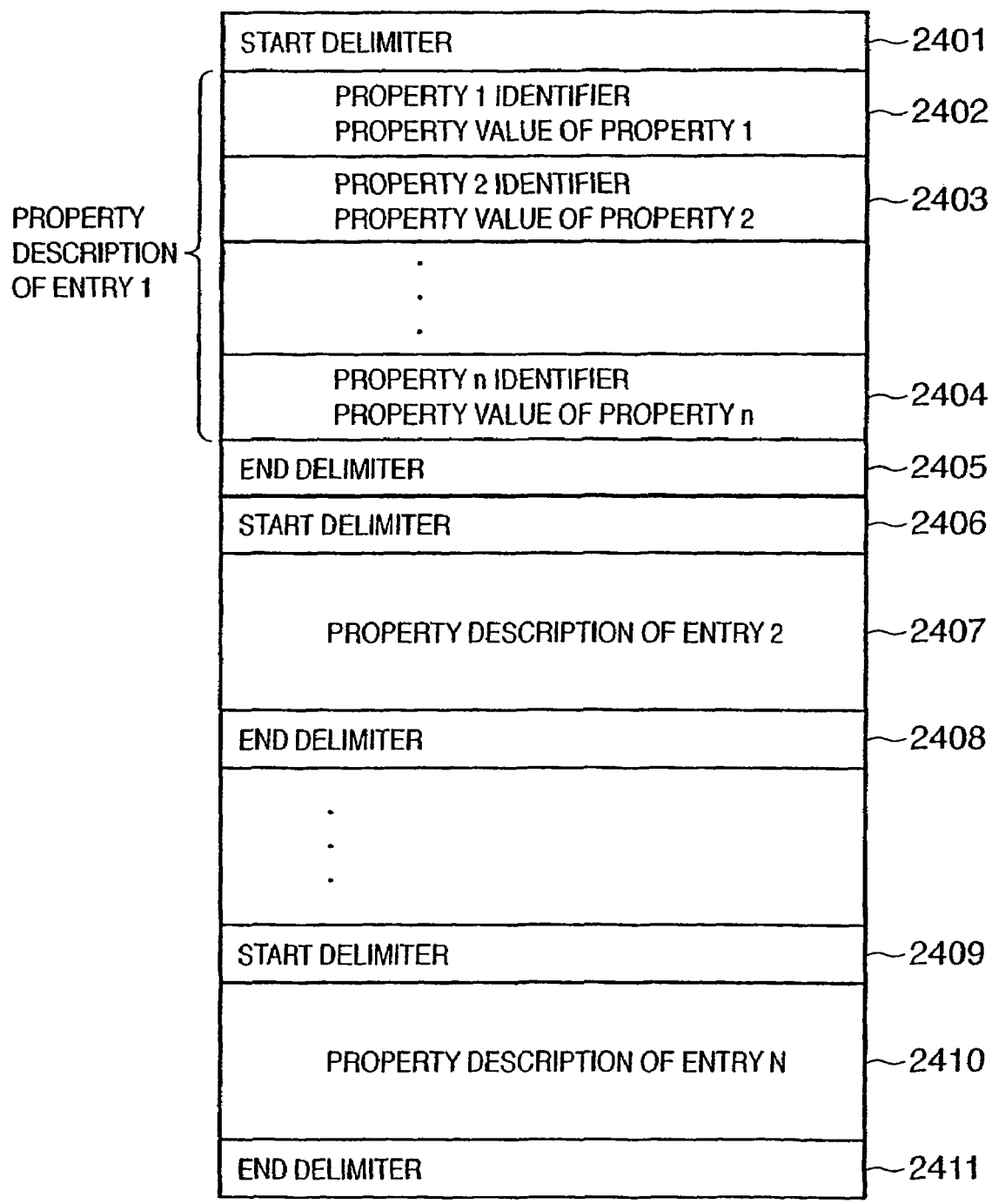
FIG. 24 shows the description file format of a database.

FIG. 24 shows the file format of data with N entries. The properties of each entry are described in fields bounded by start and end delimiters. In FIG. 24, the start delimiters of the first, second, and N-th entries are respectively denoted by 2401, 2406, and 2409. On the other hand, the end delimiters of these entries are 2405, 2408, and 2411. Each property of an entry is described as a pair of an identifier used to identify that property, and an attribute value, as indicated by 2402 to 2404. The update mode and time-out time are specified to each entry in the file with the above format. If the update mode of the entry of interest is other than the delay mode, the time-out time need not be described. In any update mode, these two properties (update mode and time-out time) need not always be described. If these properties are not described, they are set to be default values determined in advance by the system upon building the scene graph database on the memory (302 in FIG. 3) (step S1101).

Note that the aforementioned database description file describes the update mode to be selected. By contrast, one or a plurality of update modes that cannot be selected may be set. Use of such update modes that cannot be selected will be described in detail later in the update mode change operation according to the fifth embodiment.

In the above description, a data communication between the server and client is attained by a one-to-one TCP/IP socket. Alternatively, events may be exchanged by broadcast or multicast, and the communication protocol is not limited to TCP/IP.

The Ethernet is used as the communication medium. Alternatively, other information transmission media such as USB, Firewire, and the like may be used. Furthermore, the network is not limited to the LAN, and connections via a WAN may be adopted or both the LAN and WAN may be used in combination.

The number of servers is not limited to one per shared database system, and a plurality of servers may be connected. In this case, processes may be arbitrarily assigned to respective servers. For example, different servers may be used for respective clients, and servers may be prepared in correspondence with respective database entries.

Furthermore, the number of processes to be assigned to each terminal is not limited to one process per terminal, but a plurality of processes can run on one terminal. In this case, arbitrary types of processes may be combined, and the system operates in all combinations of only client processes, only server processes, and client and server processes. Note that processes which run on a single terminal may exchange data via a shared memory in place of the network.

Events are distributed to respective terminals via the server. Alternatively, a terminal on which the data manipulation has been made may directly transmit an event to other terminals. When an event is transmitted without the intervention of the server, the manipulator client receives an event from itself in, e.g., T406 in FIG. 4. Such procedure can be implemented by setting the destination of the event to a self host. Note that principal OSs have a function of making communications without distinguishing self and other hosts as a standard function.

In the above description, 3D virtual space data are shared. However, the contents of the database are not limited to such specific data, and arbitrary contents may be shared. Also, the method explained in the above embodiment can be applied to not only a case wherein the entire database is to be shared but also a case wherein the database is to be partially shared. These features also apply to other embodiments.

As described above, the first embodiment discloses an information processing method for maintaining consistency among shared data held by respective processes in a system in which each of a plurality of processes (client processes) connected via an information transmission medium holds and uses shared data (database) to be shared by these processes. Especially, upon generation of a manipulation request for the shared data, request information (event) that represents the manipulation request is output onto the information transmission medium, response information (event) to this request information is received from the information transmission medium, and a manipulation for the shared data is executed in accordance with the received response information. According to such wait mode, since the manipulation for the shared data is executed in accordance with the event received via the information transmission medium, the update timings of the shared data can be matched with high precision.

In the delay mode, when a predetermined period of time has elapsed in the timer process after generation of the manipulation request before reception of response information, the manipulation for the shared data based on the manipulation request is executed without waiting for reception of the response information. For this reason, both the high response speed in a process as a generation source of the manipulation and matching of the sync timings among a plurality of processes can be achieved.

Also, according to this embodiment, a queue item is registered in the manipulation queue in accordance with a manipulation request. When the manipulation execution process executes the manipulation for the shared data, queue control for setting the corresponding queue item to be an already processed item is executed. When an item in the manipulation queue, which corresponds to a manipulation request represented by the response information, is not set to be an already processed item, the manipulation corresponding to the response information is executed for the shared data. For this reason, a given manipulation can be prevented from being repetitively executed in the aforementioned delay mode by a simple arrangement.

According to the above embodiment, the system can operate in one of a plurality of update modes, which include a first mode (wait mode) for executing a manipulation of shared data after waiting for reception of response information in a reception process, and a second mode (delay mode) for executing a manipulation of shared data at an earlier one of an elapse timing of a predetermined period of time after generation of a manipulation request and a reception timing of response information.

Furthermore, the shared data is made up of a plurality of items (FIG. 24), each of which contains designation information used to designate a update mode to be adopted. The update mode is selected in accordance with this designation information, and a manipulation for the shared data is executed. That is, the update mode is switched for each of the plurality of items, and this configuration allows to select an appropriate update mode for each item.

In a system in which each of a plurality of processes connected via an information transmission medium holds and uses shared data to be shared by these processes, a server process establishes connection to a plurality of client processes, and receives an event associated with a change in shared data from each of these client processes, so as to maintain consistency of shared data held by the respective processes. The server process then issues the received event to the plurality of client processes.

Second Embodiment

In the first embodiment, the server distributes all events to all clients in all the update modes. However, in case of the immediate mode, the manipulator client has already executed a manipulation, and need not receive any event from the server. In this embodiment, the need for event distribution from the server is obviated in such case.

Figure 21:
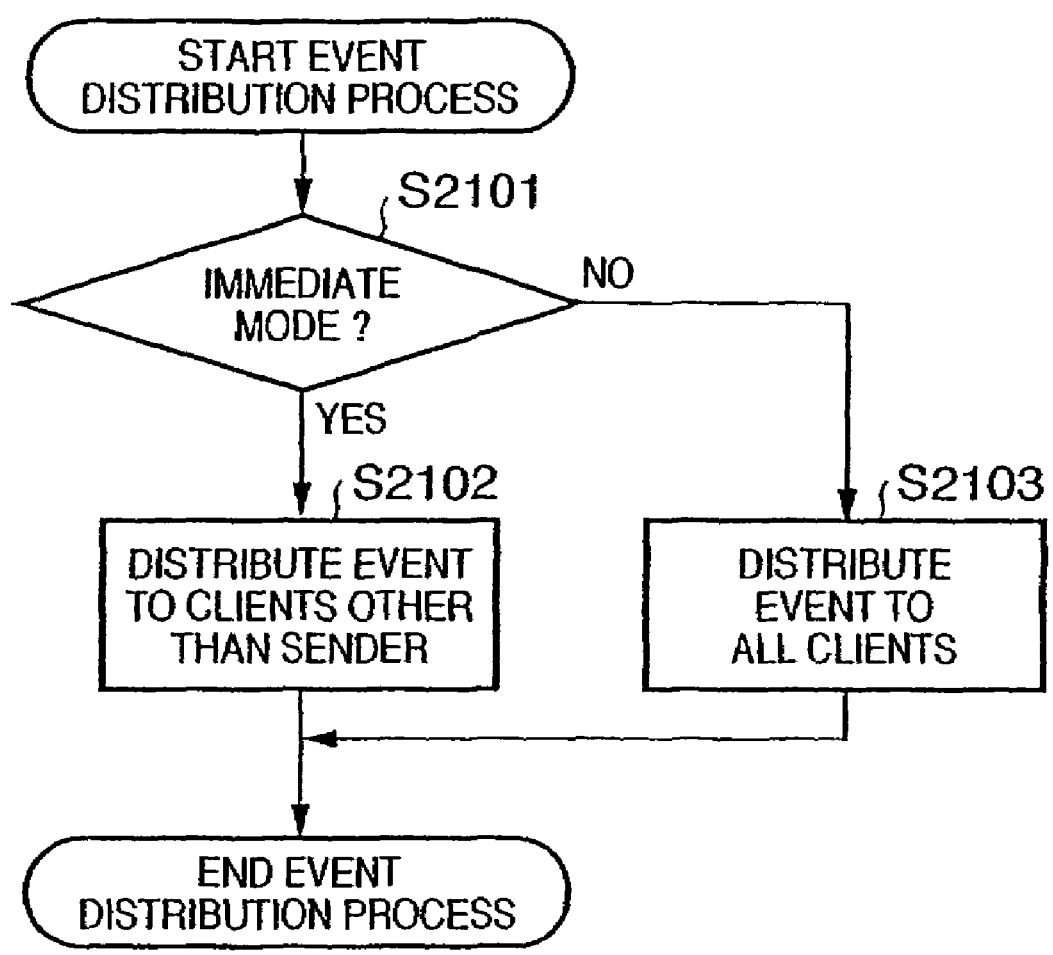
FIG. 21 is a flow chart for explaining an event distribution process of a server according to the second embodiment.

FIG. 21 shows the flow of an event distribution process in this embodiment. This process is to be executed in place of step S2004 in FIG. 20.

It is checked in step S2101 if the update mode is the immediate mode. If the update mode is the immediate mode, the server refers to the client ID field of an event, and transmits the event to clients other than that indicated by the ID (step S2102). On the other hand, if the update mode is the wait mode or delay mode, the server transmits the event to all the clients as in the first embodiment (step S2103). Since the client process as an event source does not receive any event distributed from the server process, the reference process and update process of the manipulation queue can be omitted.

As described above, according to the second embodiment, an event received by the server process contains update mode information indicating a change sequence of shared data, and the server controls distribution destinations of the event on the basis of this update mode information. For example, the server determines based on the update mode information of the received event whether or not the event source has already processed the shared data. If the server determines that the shared data has already been processed, it controls not to issue that event to the client as its source. As shown in FIG. 21, when the update mode is the immediate mode, since the manipulation execution in the source client process is complete at the time of reception of the event, the event is not distributed to the source client process.

With this process, since the total traffic of events to be transmitted from the server to the clients can be reduced, the network load can be reduced. Also, since the client process as the event source need not process the manipulation queue, the processing load on that process can be reduced.

Third Embodiment

In the first and second embodiments, when the update mode is the delay mode, an event received by the server is transmitted to the clients irrespective of the time-out time. However, when the time-out time has elapsed, the manipulator client executes a manipulation without receiving any returned event, and need not receive any event from the server. The third embodiment obviates the need for event distribution in such case.

Figure 22:
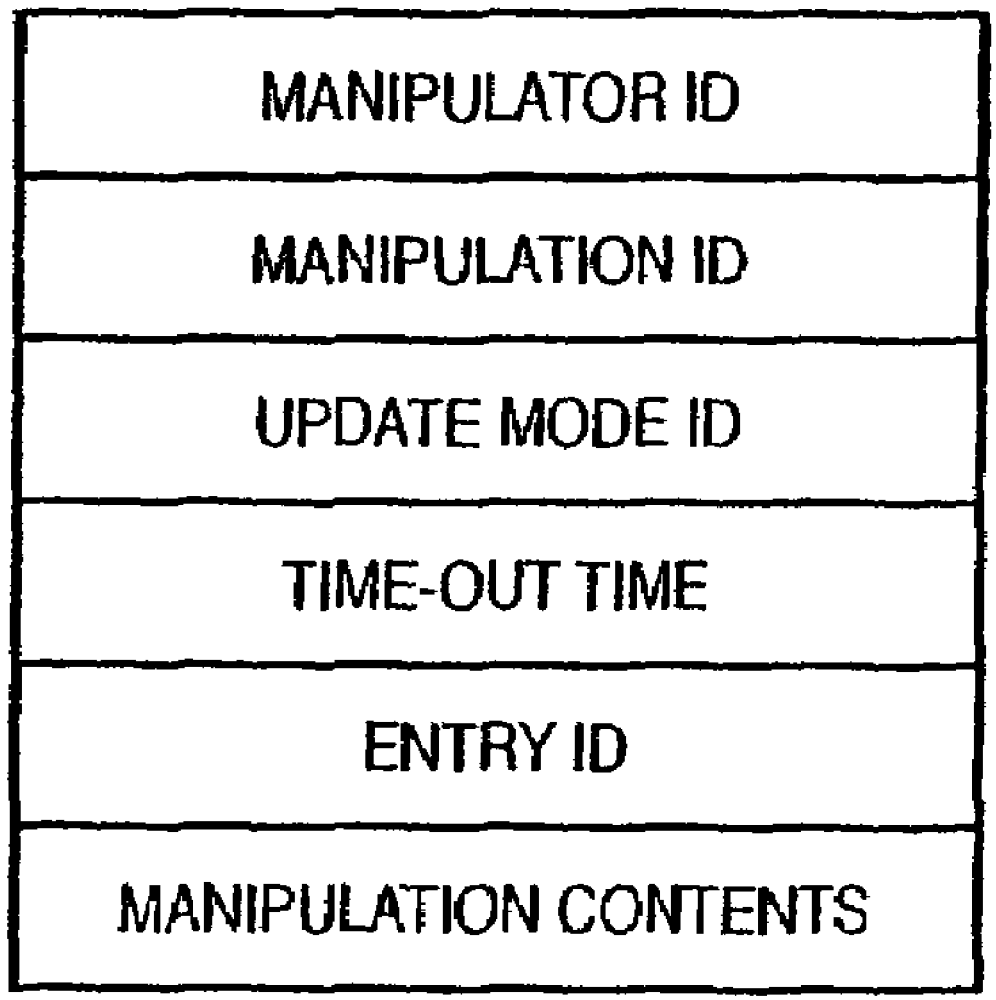
FIG. 22 shows an example of the data configuration of event data according to the third embodiment.

In case of the third embodiment, an event with the contents shown in FIG. 22 is used in place of the event contents shown in FIG. 8. In FIG. 22, the time-out time is added to the event shown in FIG. 8. This time-out time is calculated by adding the time-out interval to the generation time of a manipulation command, and is equal to a time which is used as the criterion of judgment by the timer process upon starting the manipulation execution in the manipulator client.

Figure 23:
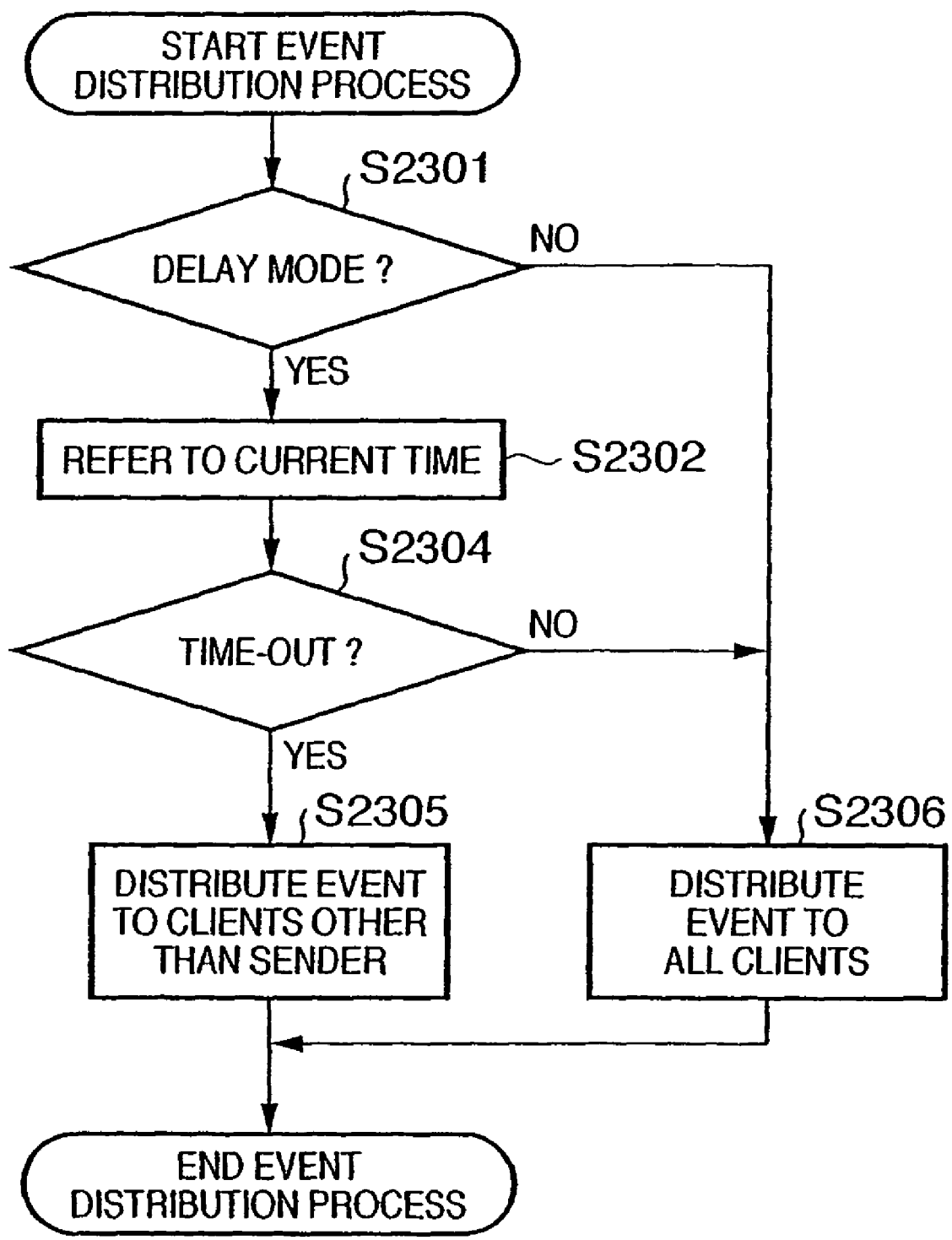
FIG. 23 is a flow chart for explaining an event distribution process of a server according to the third embodiment.

FIG. 23 shows the flow of an event distribution process in the third embodiment. This process is to be executed in place of step S2004 in FIG. 20.

It is checked in step S2301 if the update mode is the delay mode. If the update mode is the delay mode, the server refers to the current time (step S2302), and compares the current time and the time-out time described in an event (step S2304). If the current time is behind the time-out time, the server determines that the sender client has already started execution of a manipulation. Therefore, the server refers to the client ID field of the event, and transmits the event to clients other than that indicated by the ID (step S2305). On the other hand, if the update mode is other than the delay mode or if the time-out time is not reached, the flow advances to step S2306, and the server transmits the event to all the clients.

With this process, since the total number of events to be transmitted from the server to the clients can be reduced, the network load can be reduced.

Note that the current time of the client must match that of the server so as to accurately determine the relationship between the time-out time of the event and the current time of the server by comparing them. As a mechanism for this purpose, for example, NTP (Network Time Protocol) or the like can be used.

As described above, the third embodiment provides a scheme that allows to determine if the client process as an event source has completed the manipulation execution when the update mode is the delay mode. That is, the event contains the time-out time, and when the update mode information indicates a update mode (delay mode) in which a manipulation is executed if the time-out time has elapsed, and the current time has passed the time-out time, it is determined that event source has already processed shared data.

As described above, according to the second and third embodiments, since some pieces of database update information to be exchanged among terminals can be omitted, the load on the network can be reduced.

Fourth Embodiment

The event distribution processes in the immediate mode (second embodiment) and delay mode (third embodiment) have been explained. However, these processes may be combined.

That is, the fourth embodiment combines the network load reduction methods in the second and third embodiments.

Fifth Embodiment

In each of the above embodiments, the update modes are set in the database description file, and no change in update mode while the system is in service is considered. The fifth embodiment will explain a database update method having means for changing the update mode of a database.

Figure 25:
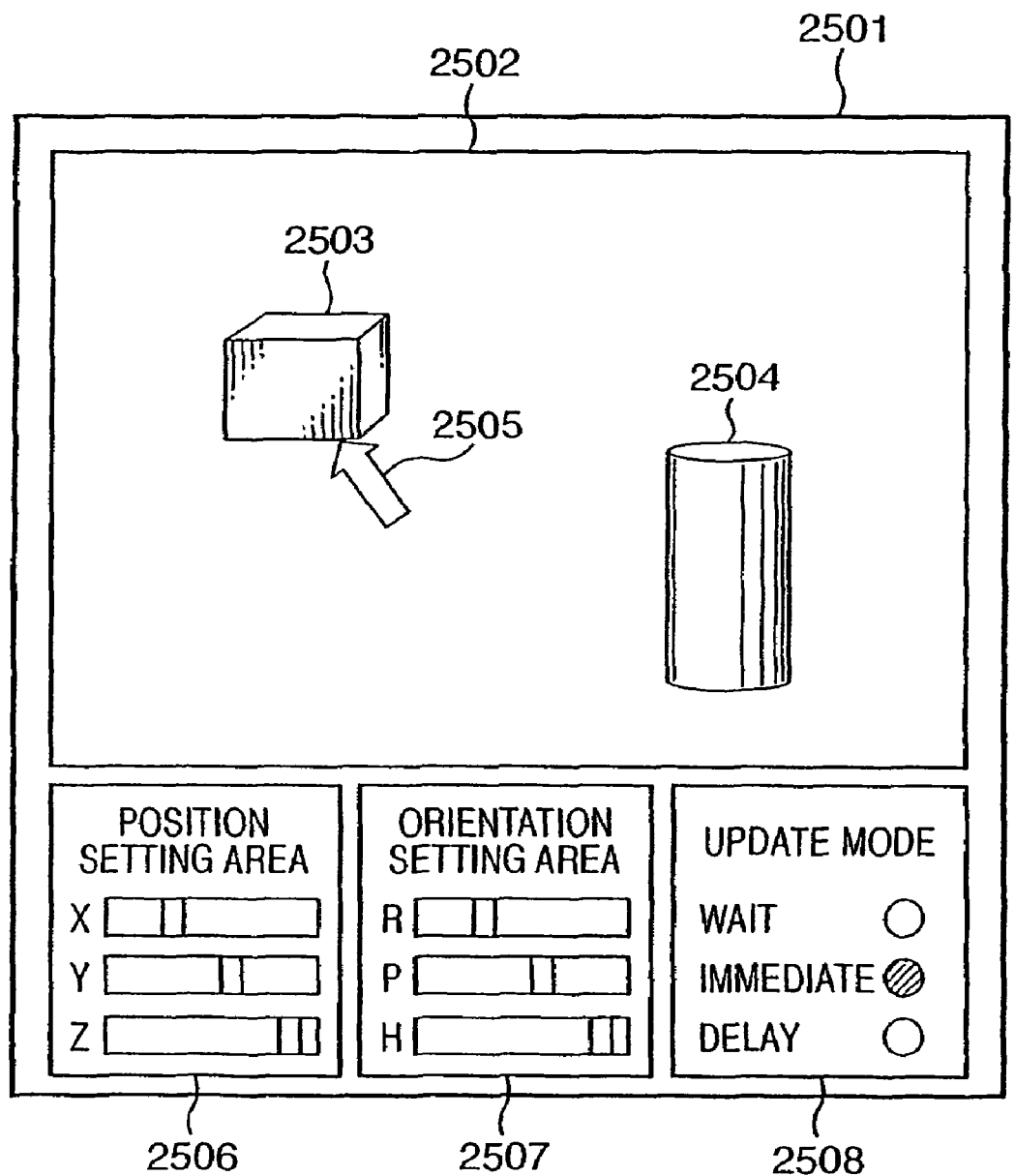
FIG. 25 shows an example of a client display window in the fifth embodiment.

FIG. 25 shows a window display example of a client in this embodiment. As in the first embodiment, the contents of the database are a 3D virtual space, and CG images of 3D virtual objects 2503 and 2504 are displayed on a 3D space display area 2502 in a display window 2501. Below the 3D space display area, a position setting area 2506, orientation setting area 2507, and update mode setting area 2508, which are respectively used to set the position, orientation, and update mode of a virtual object, are provided. On the update mode setting area 2508, radio buttons corresponding to the respective update modes are displayed.

Upon setting an update mode, the user moves a cursor 2505 onto a virtual object image whose mode is to be changed, and then clicks the left button of the mouse 308 (FIG. 3) to select that object. At this time, the radio button corresponding to the update mode, which is set for that object, is selected and displayed. Next, the user clicks the left button of the mouse to activate one corresponding to a desired mode of the radio buttons displayed on the update mode setting area. In this way, the mode of user's choice can be set by his or her interactive manipulation. Note that sliders are displayed on the position and orientation setting areas 2506 and 2507, and the position and orientation of the selected virtual object can be interactively changed by moving these sliders.

Figure 26:
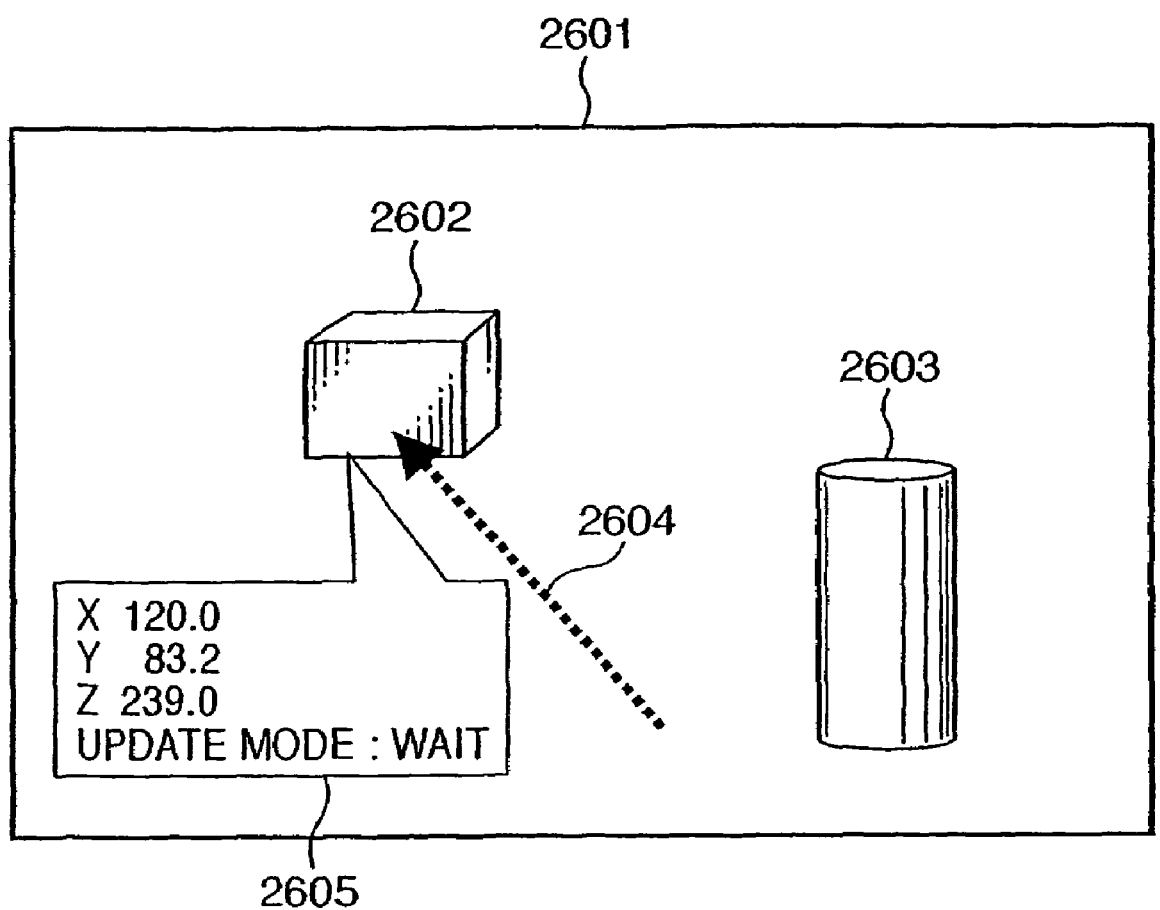
FIG. 26 shows an example of a client display window in the fifth embodiment.

FIG. 26 shows another display example and user interface example. In this case, the user wears an HMD (Head Mounted Display) on his or her head, and observes a 3D display window 2601 of a virtual space, as shown in FIG. 26. On the window, reference numerals 2602 and 2603 denote virtual objects; and 2604, a pointer used to select/manipulate an object. The user holds a stylus device 2701 shown in FIG. 27 with his or her hand, and controls the position and orientation of the pointer 2604 by moving it. Note that the stylus device has a shape like a pointing rod, and comprises a position/ orientation sensor and a button. For example, the stylus device is used for the purpose of measuring the position/orientation of the distal end portion of the rod at the time of depression of the button.

Upon changing the update mode, the user moves the stylus device 2701 so that the pointer 2604 points up a virtual object image whose mode is to be changed, and presses a select button 2702 on the stylus device 2701 to select that object. At this time, an annotation window that shows the properties of the selected object appears on the window that the user observes. The annotation window also shows the currently selected update mode. Next, the user turns a dial 2703 provided to the end portion of the stylus device. Since the update mode displayed on the annotation window changes every time the user turns the dial, the user stops turning the dial 2703 when a desired mode is displayed. In this way, the mode of user's choice can be set by his or her interactive manipulation. Note that the HMD corresponds to the display module 309 (FIG. 3). The stylus device 2701 is connected to the input/output module 310 via a data transmission cable 2704, and the CPU 301 reads out the selection state of the select button 2702 and the turning state of the dial 2703.

Figure 28:
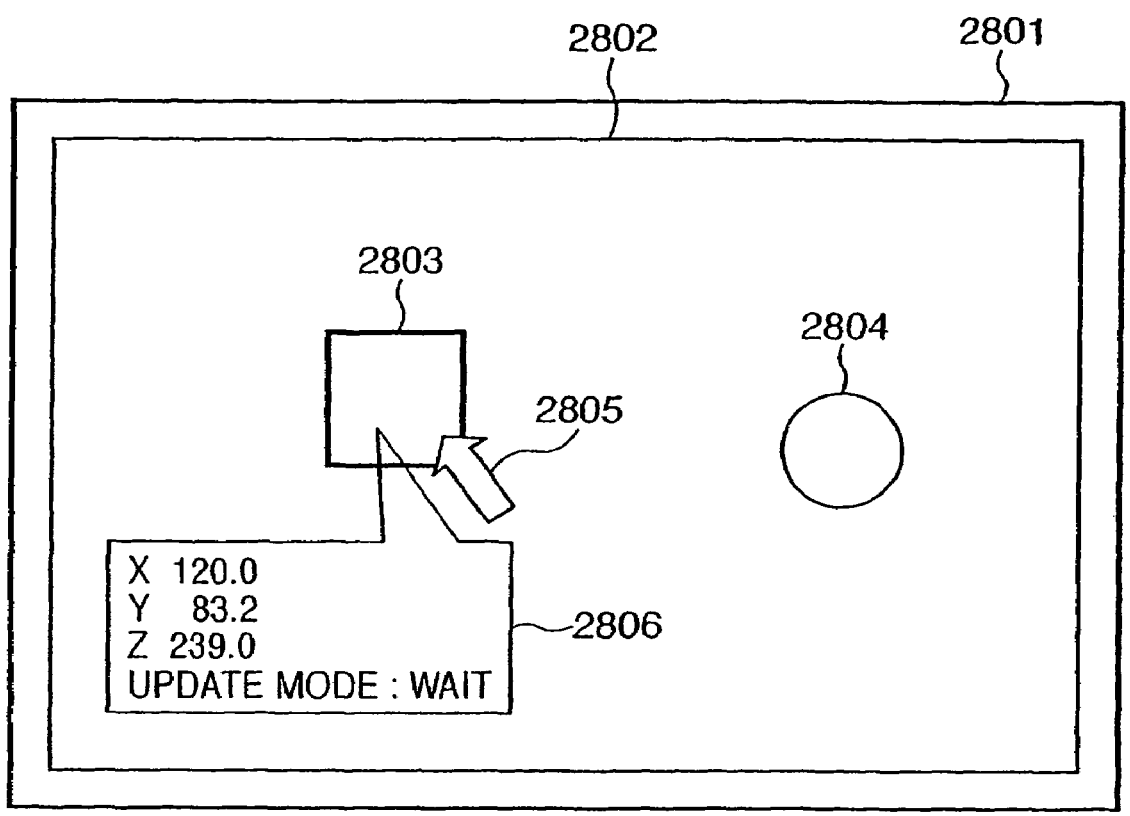
FIG. 28 shows an example of a client display window in the fifth embodiment.

In place of the 3D display of the virtual space shown in FIGS. 25 and 26, a two-dimensional (2D) display may be used. FIG. 28 shows an example of such 2D display. In this example, a 2D display area 2802 on a display window 2801 displays a 2D observation state of a 3D space from a given direction. Virtual objects 2803 and 2804 are displayed as icons on the 2D display area. When the user sets a cursor 2805 on a desired icon and clicks the left button of the mouse 308, he or she can select that object. Upon setting the update mode, after the user selects the object, he or she presses a specific key of the keyboard 307, which is set by the system in correspondence with the desired update mode. In this way, the mode of user's choice can be set by his or her interactive manipulation. Note that an annotation window 2806 that shows the properties of the selected object may be displayed on the window upon selecting the object. When the annotation display also shows the currently selected update mode, the user can set the update mode while confirming the current update mode.

The three examples of the update mode setting method have been explained. However, the aforementioned update mode setting methods may be modified so that if an update mode which cannot be selected is designated, the user cannot actually change the current mode even when he or she wants to select that mode.

Since the update mode is a property of an entry in the shared database, when a given client has changed the update mode, that change is reflected on other clients. That is, the change in update mode is also handled as one of manipulation commands, and is reflected on respective terminals using an event.

Figure 29:
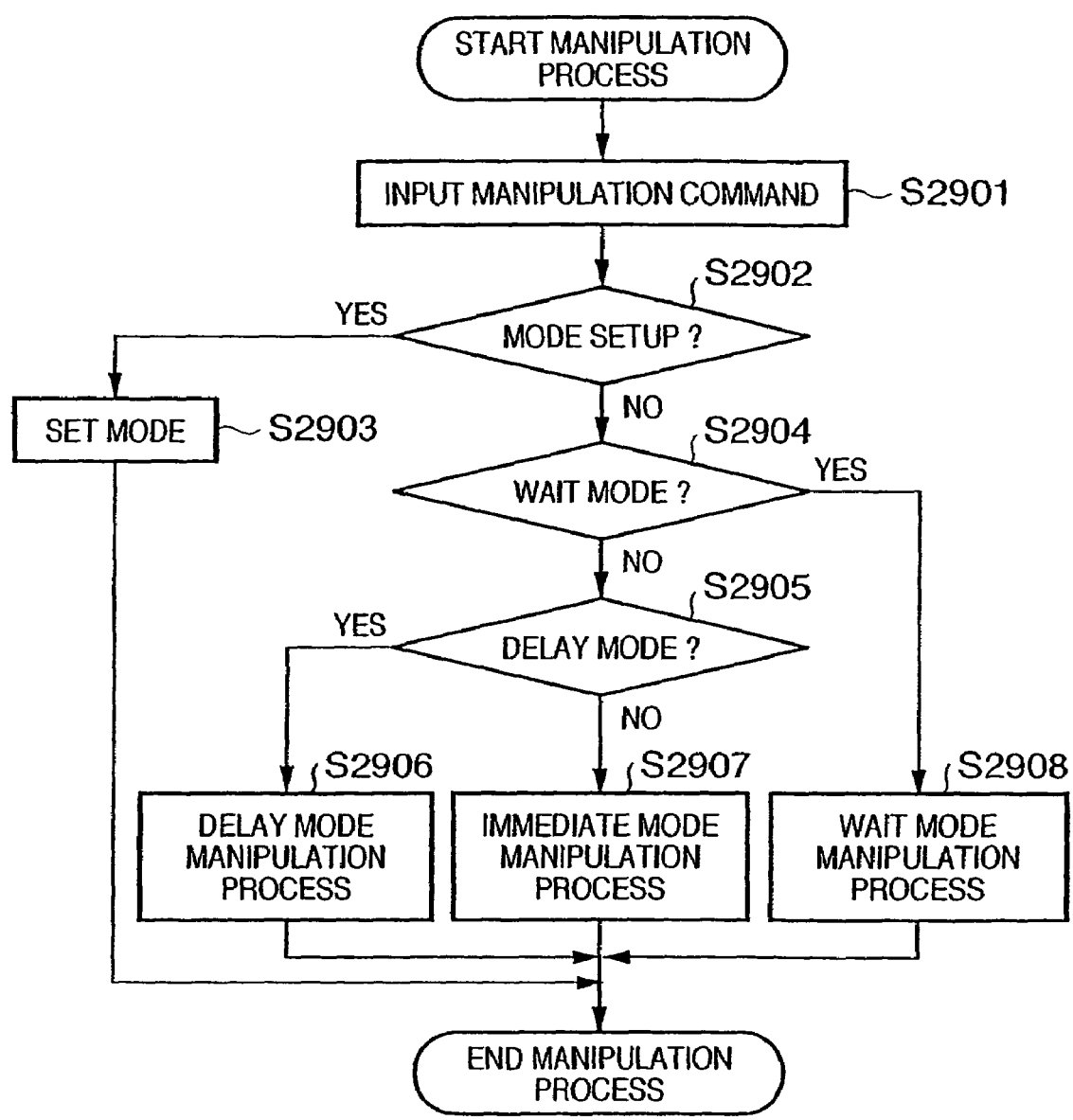
FIG. 29 is a flow chart for explaining a manipulation process in the fifth embodiment.

On the other hand, the update mode may be set for each client without sharing its setup. FIG. 29 shows the flow of the manipulation process in this case. This process is executed in place of that shown in FIG. 12.

In the process shown in FIG. 29, after a manipulation command is input in step S2901, it is checked in step S2902 if the input manipulation command is a mode setup. If it is determined that the input manipulation command is a mode setup, the flow advances to step S2903, and the property value of the update mode associated with the designated entry is set in accordance with the manipulation command. Other steps S2904, S2905, S2906, S2907, and S2908 are the same as steps S1202, S1203, S1204, S1205, and S1206 in FIG. 12.

As described above, according to the fifth embodiment, the user interface which allows the user to select an object display corresponding to a desired item (entry in FIG. 24) in the shared data and to designate a desired update mode is provided (FIG. 25 and the like). With this user interface, the user can desirably set the update mode for each item.

Also, the mode switching result of the update mode setting manipulation may be reflected on shared data of a plurality of clients or on only the shared data of the client of interest. Furthermore, whether or not the update mode setup (switching result) is shared may be allowed to be set.

Sixth Embodiment

In the fifth embodiment, the means for changing the update mode has been explained. Also, means for changing a time-out time in the delay mode may be added. The sixth embodiment will explain an embodiment that allows to change the time-out time.

For example, such means can be implemented by adding a slider used to adjust the time-out time on the display window of FIG. 25 or adding a dial used to set the time-out time to the stylus device in FIG. 27. Alternatively, the time-out time may be incremented or decremented by pressing a predetermined key of the keyboard 307.

Needless to say, the system may comprise one or both of the update mode change means explained in the fifth embodiment and the time-out time change means explained in the sixth embodiment.

Seventh Embodiment

In the above embodiments, the update mode and time-out time are set for each entry of the database. Alternatively, the update mode and time-out time may be allowed to be set for each client. Also, the update mode and time-out time may be allowed to be set for each property of an entry of the database.

Eighth Embodiment

In some database systems, a process for updating data and a process for referring to data are executed in a given order. In such case, even when a time delay is produced from a given manipulation command to its execution, if the execution is completed in any data update process, the manipulation result is reflected on reference immediately after that update process.

Figure 30:
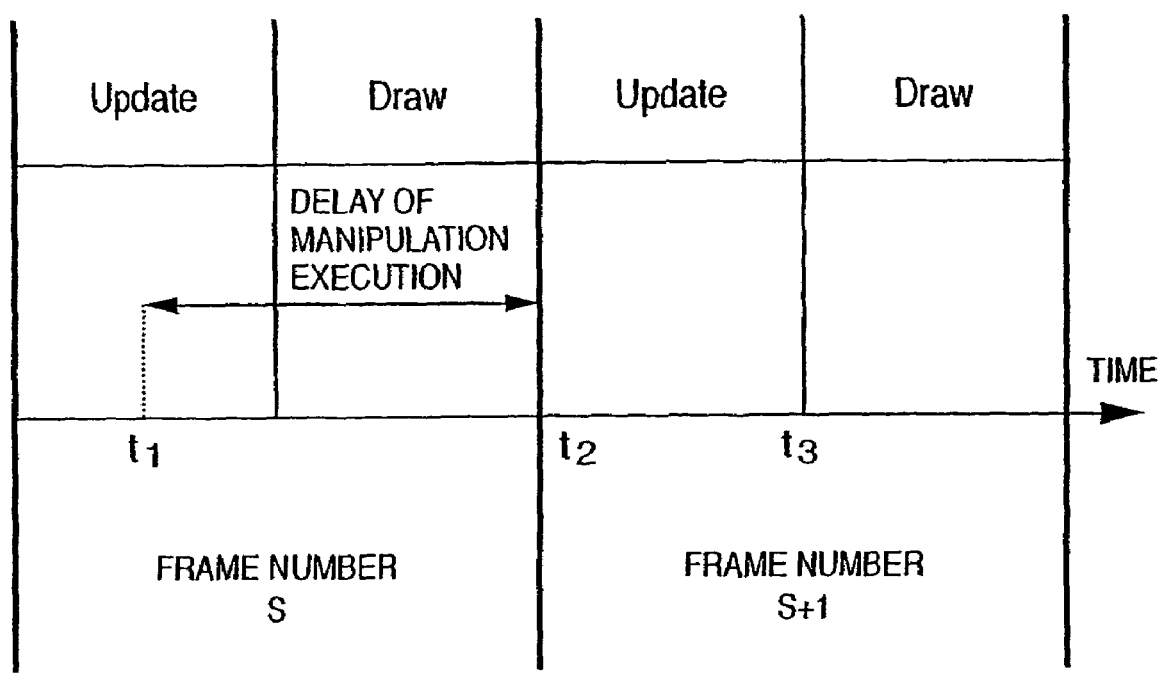
FIG. 30 is a schematic diagram showing the method of setting a time-out time in the eighth embodiment.

In general, a virtual space drawing system is one of the aforementioned systems, and an update process of a scene graph and scene drawing process are alternately executed. FIG. 30 is a schematic diagram showing such system. In FIG. 30, "Update" represents the update process, and "Draw" represents the drawing process. A pair of update and drawing processes is called a frame. In FIG. 30, $t_1$ is the manipulation command generation time, $t_2$ is the time-out time, and $t_3$ is the time at which the manipulation result is reflected.

Assume that the request specification associated with a delay until the result of a manipulation command is reflected on the database is less than two frames. Also, assume that one manipulation command is generated at time $t_1$ of the S-th frame. If this manipulation is executed before time $t_3$, the request specification is satisfied. To attain this, the manipulation command can be processed in the delay mode by setting, e.g., time-out time $t_2$. However, it is normally difficult to estimate time $t_2$.

Hence, the eighth embodiment will explain an embodiment that can automatically determine the execution timing of a manipulation command.

In the aforementioned timer process (FIG. 19), a procedure for detecting the beginning of the database update process is added in place of steps S1903 and S1904 of confirming the time-out time. If the beginning of the update process is detected in that process, the flow advances to step S1905; otherwise, the flow returns to step S1901. Note that the timer process may be interrupted when the update process in FIG. 30 has started in place of detecting the beginning of the update process, and the flow may advance to step S1905.

As described above, according to the eighth embodiment, when the start time of the update process, which is determined by the system, is reached before reception of response information, the manipulation of the shared data based on the manipulation request is executed without waiting for reception of the response information. That is, the time-out timing is automatically set, and the manipulation command can be executed with a desired delay time.

Ninth Embodiment

In the fifth embodiment, all the update modes are manually set. By contrast, the ninth embodiment will explain an embodiment that automatically sets the update mode. In this embodiment, if a manipulation command is generated based a user's interactive manipulation, the immediate or delay mode is automatically set.

In order to realize such process, when an interactive manipulation is made, a process for adding a command that sets the update mode in the immediate or delay mode can be added before a process for generating a manipulation command. At this time, which of the immediate and delay modes is to be set is determined in advance for each type of interactive manipulations. For example, when the user moves or rotates a virtual object using the sliders in FIG. 25 or the stylus in FIG. 27, the immediate mode is set. On the other hand, when the user selects an object by clicking the mouse button or pressing the select button (2702 in FIG. 27), the delay mode is set.

As described above, according to the ninth embodiment, a update mode is set in accordance with the manipulation contents for an object corresponding to an item of shared data. For example, since the update mode is automatically set in the immediate or delay mode, a time delay from an interactive manipulation command until manipulation execution can be shortened compared to the wait mode, thus reducing unpleasantness due to the delay.

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Effect of Invention

As described above, according to the present invention, the manipulation execution timings for shared data to be shared by a plurality of processes can be accurately matched.

As many apparently widely different embodiments of the present invention can be made without departing from the spirit and scope thereof, it is to be understood that the invention is not limited to the specific embodiments thereof except as defined in the claims.

The invention claimed is:

1. An information processing method for maintaining, in a system in which each of a plurality of client processes connected via an information transmission medium holds and uses shared data to be shared by the plurality of client processes, consistency of shared data held by the respective plurality of client processes, comprising:

a holding step of holding the shared data, wherein the shared data include a plurality of items, and mode information is provided for each of the plurality of items;

an input step of inputting an input manipulation request generated by its own client process;

a determining step of determining a mode, based on the mode information corresponding to an item which is a target of the input manipulation request, from a plurality of modes including a first mode, a second mode, and a third mode; and a processing step of executing a process corresponding to the input manipulation request input in the input step or a received manipulation request generated by another client process, wherein, with regard to execution of the received manipulation request, the processing step includes:

a receiving step of receiving the received manipulation request generated by a client process other than its own client process, via a server process; and an execution step of executing a process corresponding to the received manipulation request in order of receiving the received manipulation request, and wherein, with regard to execution of the input manipulation request input in the input step, the processing step includes:

a sending step of sending, when the manipulation request requests a manipulation of the shared data, request information that represents the input manipulation request to the server process;

a reception step of receiving response information corresponding to the request information sent in the sending step, from the server process; and a manipulation execution step of executing a manipulation for the shared data in accordance with the input manipulation request or the response information received in the reception step, and wherein, in a case where the determining step determines that the mode corresponding to the input manipulation request input in the input step is the first mode, the manipulation execution step manipulates the shared data in response to the input manipulation request and the sending step sends the request information indicating the input manipulation request to the server process, and wherein, in a case where the determining step determines that the mode corresponding to the input manipulation request input in the input step is the second mode, the sending step sends the request information indicating the manipulation request to the server process in response to the input manipulation request, and the manipulation execution step manipulates the shared data based on the input manipulation request indicated by a reception information in response to reception of the reception information when the reception information is received from the server process within a time limit of manipulation execution, and the manipulation execution step manipulates the shared data in accordance with the input manipulation request corresponding to the request information when the reception information is not received from the server process within a time limit of manipulation execution, and wherein, in a case where the determining step determines that the mode corresponding to the input manipulation request input in the input step is the third mode, the sending step sends, in accordance with the input manipulation request, request information that represents the input manipulation request to the server process, and the manipulation execution step manipulates the shared data in accordance with the input manipulation request corresponding to the request information in response to reception of the reception information.

2. The method according to claim 1, further comprising a step of providing a user interface that allows a user to select an object display corresponding to a desired item and to designate a desired update mode.

3. The method according to claim 1, wherein a mode selected through the user interface is reflected on the shared data of the plurality of client processes.

4. The method according to claim 1, further comprising a setting step of setting the time limit of manipulation execution.

5. A storage medium storing a control program for making a computer execute the information processing method of claim 1.

6. An information processing apparatus for maintaining, in a system in which each of a plurality of client processes connected via an information transmission medium holds and uses shared data to be shared by the plurality of client processes, consistency of shared data held by the respective plurality of client processes, comprising:

a holding unit configured to hold the shared data, wherein the shared data include a plurality of items, and mode information is provided for each of the plurality of terms;

an input unit configured to input an input manipulation request generated by its own client process;

a determining unit configured to determine a mode, based on the mode information corresponding to an item which is a target of the input manipulation request, from a plurality of modes including a first mode, a second mode, and a third mode; and a processing unit configured to execute a process corresponding to the input manipulation request input by the input unit or a received manipulation request generated by another client process, wherein, with regard to execution of the received manipulation request, the processing unit includes:

a receiving unit configured to receive the received manipulation request generated by a client process other than its own client process, via a server process; and an execution unit configured to execute a process corresponding to the received manipulation request in order of receiving the received manipulation request, and wherein, with regard to execution fo the input manipulation request input in the input step, the processing step includes:

a sending unit configured to, when the manipulation request requests a manipulation of the shared data, send request information that represents the input manipulation request to the server process;

a reception unit configured to receive response information corresponding to the request information sent by said sending unit, from the server process; and a manipulation execution unit configured to execute a manipulation for the shared data in accordance with the input manipulation request or the response information received in said reception unit, and wherein, in a case where said determining unit determines that the mode corresponding to the input manipulation request input by said input unit is the first mode, said manipulation execution unit manipulates the shared data in response to the input manipulation request and said sending unit sends the request information indicating the input manipulation request to the server process, and wherein, in a case where said determining unit determines that the mode corresponding to the input manipulation request input by said input unit is the second mode, said sending unit sends the request information indicating the manipulation request to the server process in response to the input manipulation request, and said manipulation execution unit manipulates the shared data based on the input manipulation request indicated by a reception information in response to reception of the reception information when the reception information is received from the server process within a time limit of manipulation execution, and said manipulation execution unit manipulates the shared data in accordance with the input manipulation request corresponding to the request information when the reception information is not received from the server process within a time limit of manipulation execution, and wherein, in a case where said determining unit determines that the mode corresponding to the input manipulation request input in the input step is the third mode, said sending unit sends, in accordance with the input manipulation request, request information that represents the input manipulation request to the server process, and said manipulation execution unit manipulates the shared data in accordance with the input manipulation request corresponding to the request information in response to reception of the reception information.

* * * * *